(12) United States Patent
Strand

(10) Patent No.: US 7,591,929 B2
(45) Date of Patent: Sep. 22, 2009

(54) OIL SAND PROCESSING APPARATUS AND CONTROL SYSTEM

(75) Inventor: William L. Strand, Edmonton (CA)

(73) Assignee: Bitmin Resources, Inc., Calgary (CA)

( * ) Notice: Subject to any disclaimer, the term of this patent is extended or adjusted under 35 U.S.C. 154(b) by 631 days.

(21) Appl. No.: 11/194,338

(22) Filed: Aug. 1, 2005

(65) Prior Publication Data
US 2007/0025896 A1 Feb. 1, 2007

(30) Foreign Application Priority Data
Jul. 13, 2005 (CA) .................................. 2512106

(51) Int. Cl.
*B01D 11/00* (2006.01)
*C10G 1/04* (2006.01)
(52) U.S. Cl. .................... 196/14.52; 422/270; 422/273; 422/287; 208/390; 208/391
(58) Field of Classification Search .............. 196/14.52; 422/270, 273, 287; 210/772; 208/390, 391
See application file for complete search history.

(56) References Cited

U.S. PATENT DOCUMENTS

| | | |
|---|---|---|
| 3,331,765 A | 7/1967 | Canevari et. al. |
| 3,594,306 A | 7/1971 | Dobson |
| 3,869,384 A | 3/1975 | Schutte |
| 3,893,907 A | 7/1975 | Canevari |
| 3,904,520 A | 9/1975 | Dancy |
| 3,984,920 A * | 10/1976 | Raymond et al. .............. 34/134 |
| 4,098,648 A * | 7/1978 | Kraemer et al. .......... 196/14.52 |
| 4,160,718 A | 7/1979 | Rendall |

(Continued)

FOREIGN PATENT DOCUMENTS

CA 645043 7/1962

(Continued)

OTHER PUBLICATIONS

A. Corti and M. Dente, "Athabasca Mineable Oil Sands: The RTR/Gulf Extraction Process," Paper No. 81, 4th UNITAR/UNDP Conference on Heavy Crude and Tar Sands, 6pp.

(Continued)

*Primary Examiner*—N. Bhat
(74) *Attorney, Agent, or Firm*—Rodman & Rodman; Terrence Kuharchuk

(57) ABSTRACT

An apparatus for processing oil sand to produce a liquid stream comprising water and bitumen and a solid stream comprising solid particles, and a method and control system for controlling the apparatus. The apparatus includes a drum having first and second ends, a conditioning zone adjacent the first end, a compressing zone adjacent the second end and a processing zone therebetween. A rotatable spiral trough, having lifting members therein, extends through each zone for imparting a spiral rolling motion to the oil sand. An oil sand inlet communicates with the conditioning zone, while a water inlet communicates with the processing zone. A liquid stream outlet is located at the first end of the drum, while a solid stream outlet is located adjacent the second end. Preferably, the spiral trough has a width through the compressing zone less than through the processing zone and a height through at least a portion of the compressing zone greater than through the processing and conditioning zones.

66 Claims, 9 Drawing Sheets

U.S. PATENT DOCUMENTS

| | | | |
|---|---|---|---|
| 4,172,025 | A | 10/1979 | Porteous et al. |
| 4,225,433 | A | 9/1980 | Liu et al. |
| 4,236,995 | A | 12/1980 | Kruyer |
| 4,240,897 | A | 12/1980 | Clarke |
| 4,250,016 | A | 2/1981 | Estes et al. |
| 4,324,652 | A | 4/1982 | Hack |
| 4,330,409 | A | 5/1982 | Yong et al. |
| 4,331,532 | A | 5/1982 | Bose |
| 4,392,949 | A * | 7/1983 | Kruyer ............ 209/5 |
| 4,399,039 | A | 8/1983 | Yong |
| 4,406,788 | A | 9/1983 | Meadus et al. |
| 4,414,117 | A | 11/1983 | Yong et al. |
| 4,425,227 | A | 1/1984 | Smith |
| 4,435,363 | A * | 3/1984 | Boldt ............ 422/270 |
| 4,456,533 | A | 6/1984 | Seitzer |
| 4,459,200 | A | 7/1984 | Dente et al. |
| 4,470,899 | A | 9/1984 | Miller et al. |
| 4,512,956 | A * | 4/1985 | Robinson et al. ...... 422/270 |
| 4,533,459 | A | 8/1985 | Dente et al. |
| 4,561,965 | A | 12/1985 | Minkkinen |
| 4,576,572 | A * | 3/1986 | Mueller et al. .......... 432/13 |
| 4,648,964 | A | 3/1987 | Leto et al. |
| 4,678,558 | A * | 7/1987 | Belluteau et al. ...... 208/390 |
| 4,702,487 | A | 10/1987 | Stoian et al. |
| 4,828,688 | A | 5/1989 | Corti et al. |
| 4,946,597 | A | 8/1990 | Sury |
| 5,290,433 | A | 3/1994 | Chan et al. |
| 5,480,566 | A * | 1/1996 | Strand .............. 210/772 |
| 5,645,714 | A | 7/1997 | Strand et al. |
| 5,698,235 | A * | 12/1997 | Satoh et al. ........... 425/208 |
| 5,723,042 | A * | 3/1998 | Strand et al. .......... 208/391 |

FOREIGN PATENT DOCUMENTS

| | | |
|---|---|---|
| CA | 793288 | 8/1968 |
| CA | 793812 | 9/1968 |
| CA | 892547 | 2/1972 |
| CA | 1021709 | 11/1977 |
| CA | 1085761 | 9/1980 |
| CA | 1165712 | 4/1984 |
| CA | 1167238 | 5/1984 |
| CA | 2015784 | 10/1991 |
| CA | 2030934 | 5/1992 |
| CA | 2124199 | 6/1992 |
| CA | 2088320 | 7/1993 |
| CA | 2123076 | 11/1995 |
| DE | 360977 | 10/1922 |
| DE | 26 11 251 | 10/1976 |
| DE | 38 15 309 | 11/1988 |
| WO | WO 92/09672 | 6/1992 |

OTHER PUBLICATIONS

RTR-Gulf, "Oil Sands Extraction," Process Evaluation, 1982, vol. 1, Executive Summary, 20 pp.

Sheeran, D., Sethi, A. and Smith, P., "An Integrated Approach to Environmentally Acceptable Disposal of Athabasca Oilsand Fine Tailings,"Joint CSCE-ASCE Ntl. Conf., 1993, 8 pp.

Scott, J.D. and Cymerman, G.J., "Prediction of Viable Tailings Disposal Methods," Proc. of Symposium:Sedimentation Consolidation Models, ASCE, 1984, San Francisco, pp. 522-544.

Somasundaran, P., "Principles of Flocculation, Dispersion and Selective Flocculation," Proc. of Intl. Symp. on Fine Particles Processing, Las Vegas, Nev., 1980, pp. 947-976.

The NALCO Water Handbook, Kemmer, Frank, N., Ed., McGraw-Hill Book Company, 1979, pp. 4-7-4-10.

Dusseault, M.B. and Ash, P.O., "Strength Development in Oil Sands Sludge/Clay Shale Mixes for Tailings Disposal," UF/FIPR Symp. May 1987, Lakeland, FL, 17 pp.

Stevens, G.S., Rendall, E.O., Livingstone, W.R., "The Oslo Commercial Extraction Process . . . ," CIM/AOSTRA 1991 Tech. Conf., Banff, AB, pp. 96-1 to 96-8.

* cited by examiner

OIL SAND PROCESSING APPARATUS AND CONTROL SYSTEM

FIELD OF INVENTION

The present invention relates to an apparatus for processing oil sand to produce a liquid stream comprising water and bitumen and a solid stream comprising solid particles. The present invention further relates to a control system for the apparatus and a method for controlling the apparatus.

BACKGROUND OF INVENTION

Oil sand is essentially a matrix of bitumen, mineral matter and water. The bitumen component of oil sand consists of viscous hydrocarbons which behave much like a solid at normal in situ temperatures and which act as a binder for the other components of the oil sand matrix. The mineral matter component of oil sand typically consists largely of sand, but may also include rock, silt and clay. Sand and rock are considered to be coarse mineral matter, while clay and silt are considered to be fine mineral matter, where fines are defined as mineral matter having a particular size of less than 44 microns. The water component of oil sand consists essentially of a film of connate water surrounding the sand in the oil sand matrix, and may also contain particles of fine mineral matter within it.

A typical deposit of oil sand will contain about 10% to 12% bitumen and about 3% to 6% water, with the remainder of the oil sand being made up of solid mineral matter particles. Typically the mineral matter component in oil sand will contain about 14% to 20% fines, measured by weight of total mineral matter contained in the deposit, but the amount of fines may increase to about 30% or more for poorer quality deposits. Oil sand extracted from the Athabasca area near Fort McMurray, Alberta, Canada, averages about 11% bitumen, 5% water and 84% mineral matter, with about 15% to 20% of the mineral matter being made up of fines.

Oil sand deposits are mined for the purpose of extracting bitumen from the oil sand, which bitumen is then upgraded to synthetic crude oil. Accordingly, various processes have been developed for extracting the bitumen from the oil sand.

For instance, conventionally, a "hot water process" is used for extracting bitumen from oil sand in which both aggressive thermal action and aggressive mechanical action are used to liberate and separate bitumen from the oil sand. The hot water process is a three step process. First, the oil sand is conditioned by mixing it with hot water at about 95° Celsius and steam in a conditioning vessel which vigorously agitates the resulting slurry in order to completely disintegrate the oil sand. Second, once the disintegration is complete, the slurry is separated by allowing the sand and rock to settle out, and the bitumen, having air entrained within it, floats to the top of the slurry and is withdrawn as a bitumen froth. Third, the remainder of the slurry, which is referred to as the middlings, is then treated further or scavenged by froth flotation techniques to recover bitumen that did not float to the top of the slurry during the separation step.

To assist in the recovery of bitumen during the separation step, sodium hydroxide (caustic) is typically added to the slurry during the conditioning step in order to maintain the pH of the slurry slightly basic, in the range of 8.0 to 8.5. This has the effect of chemically dispersing the clay that becomes dispersed in the slurry during the conditioning step, which in turn reduces the viscosity of the slurry by reducing the particle size of the clay minerals present in the slurry. With the clay present in the slurry chemically dispersed and the viscosity of the slurry lowered, the bitumen more readily floats to the surface of the slurry and can therefore be more readily recovered during the separation step.

There are several disadvantages to the hot water process. The use of hot water and steam in the process, as well as the vigorous agitation to which the oil sand is subjected during the conditioning step, mean that the energy requirements of the process are very high. In addition, since the main goal of the hot water process is to liberate and separate bitumen from the oil sand by completely destroying the oil sand matrix, most of the fine mineral matter contained in the oil sand becomes mechanically dispersed throughout the slurry during the conditioning step.

The addition of caustic to the slurry to reduce the viscosity of the slurry results in further chemical dispersal of the clay in the fine mineral matter, whereby the size of the individual clay particles may be reduced to as small as 0.2 microns. The combination of the vigorous and complete physical dispersal of the fines contained in the oil sand and the chemical dispersal of the clay in the resulting slurry create a middlings stream that may contain a large amount of very well dispersed fines held in suspension, particularly where the oil sand deposit is of lower quality and therefore has a relatively high fines content. As the fines content of the oil sand feedstock increases, the concentration of fines in the slurry increases, and recovery of bitumen from the slurry becomes more difficult, since the suspended fine particles tend to "trap" bitumen within the slurry.

In addition to the problems regarding the recovery of bitumen from slurries containing a large amount of dispersed fines, the middlings stream that remains following the scavenging step poses a huge disposal problem, since it constitutes a sludge that tends to settle and consolidate very slowly. Typically, the practice for the disposal of the sludge remaining after the scavenging step involves pumping it into huge tailing ponds, where the fines slowly settle and stratify. After several weeks, some of the water forming the sludge will be present at the top of the tailing pond containing only a small amount of suspended fines. This water may be recycled for use in the hot water process, after being reheated to the process temperature.

In any event, because of the characteristics of the middlings sludge, the tailing ponds cannot be completely rehabilitated for many, many years, and only a portion of the water that enters the tailing ponds can be recovered and reused in the hot water process, thus creating a requirement that a large amount of makeup water be available for the hot water process to make up for the water that is lost to the tailing ponds.

Some attempts have been made to improve upon the hot water process, such as: Canadian Patent No. 1,085,761 issued on Sep. 16, 1980 to Rendall; U.S. Pat. No. 4,512,956 issued on Apr. 23, 1985 to Robinson et al; U.S. Pat. No. 4,533,459 issued on Aug. 6, 1985 to Dente et al; U.S. Pat. No. 4,414,117 issued on Nov. 8, 1983 to Yong et al; and U.S. Pat. No. 4,225,433 issued Sep. 30, 1980 to Liu et al. However, none of these attempts have been found to be fully satisfactory.

The challenge remains to extract bitumen from oil sand in a manner maximizing the recovery of bitumen while minimizing the amount of sludge that is generated, and while controlling the physical characteristics of the sludge so that it may be more easily disposed of. It is also desirable to minimize the energy requirements of the process as much as possible so that the process can be carried out in an economical and environmentally acceptable manner.

In this regard, Canadian Patent Application No. 2,030,934 published on May 28, 1992 by Strand and Canadian Patent Application No. 2,124,199 published on Jun. 11, 1992 by Strand, both describe an extraction apparatus and process employing a countercurrent separator vessel in which oil sand is gently rolled from one end to the other by a spiral ribbon and mixer elements while hot water, defined as having a temperature of 50° Celsius, circulates in the opposite direction. Two streams are then removed from opposite ends of the separator vessel. One stream contains coarse material and some water, while the other stream contains bitumen and dispersed fines in a slurry. Mechanical action is minimized and liberation and separation of bitumen is accomplished almost entirely by thermal action.

It is stated in these applications that an important objective of the invention is to leave most of the clay in the oil sand in its original state so that it may be returned along with separated coarse material, to the site from which the oil sand was mined. It is also stated that due to limited dispersal of clay in the process water, it should not normally be necessary to add caustic to aid in the recovery of bitumen, and a substantial portion of the process water will be available for recycling. As for the amount of process water required, it is stated that the water to oil sand ratio is a function of the heat transfer requirements of the system, and not the requirement to provide adequate dilution of the slurry to facilitate bitumen recovery.

Further, Canadian Patent No. 2,123,076 issued Nov. 17, 1998 to Strand et. al. utilizes the countercurrent separator vessel of the previously noted Canadian Patent Applications in the performance of an improved oil sand extraction process. Specifically, Strand et. al. describes an overall method for processing lumps of oil sand containing bitumen to produce a bitumen froth and non segregating tailings of a solid material and a sludge.

The method includes depositing the lumps of oil sand into a bath of warm water. The lumps are then conditioned by gently contacting them with the warm water to liberate and separate bitumen from the oil sand while minimizing the dispersal into the bath of fine material contained in the oil sand. The conditioning step is preferably performed utilizing the previously described countercurrent separator vessel, as shown in FIGS. 2 and 3 of Canadian Patent No. 2,123,076.

Following conditioning, the solid material remaining after the liberation and separation of the bitumen from the oil sand is removed from the bath and collected for further processing. The warm water containing bitumen and dispersed fine material is also removed from the bath and collected for further processing.

Following removal from the bath, the warm water containing bitumen and dispersed fine material is separated into the bitumen froth and a suspension of dispersed fine material. The suspension of dispersed fine material is dewatered to produce the sludge, which is combined with the solid material to produce the tailings. Preferably, the sludge is combined with the solid material in a mixing drum as shown in FIG. 4 of Canadian Patent No. 2,123,076.

The stated goal of Canadian Patent No. 2,123,076 is to eliminate or reduce the need for sludge tailing ponds which typically occupy many square kilometers, and replace the sludge currently disposed of in these tailing ponds with non-segregating tailings produced from both the solid material generated by the extraction process and the sludge generated by the extraction process. In order to minimize the energy requirements of the described process, the thermal and mechanical energy input into the process are limited, while also limiting the amount of thermal energy that is lost during the process to the various product and waste streams.

However, there continues to be a need for improvements to be made to the oil sand processing methods and apparatuses in order to increase the efficiencies and to enhance or improve upon the characteristics or qualities of the resulting products of such methods and apparatuses.

Accordingly, there is a need in the industry for an improved apparatus for processing oil sand to produce a liquid stream and a solids stream having desirable characteristics or qualities. Further, to enhance or facilitate the efficient operation of the improved apparatus, there is a need for an improved control system and method for controlling the apparatus.

SUMMARY OF INVENTION

The present invention relates to an apparatus for processing oil sand to produce a liquid stream comprising water and bitumen and a solid stream comprising solid particles. Further, the present invention relates to a control system for an apparatus for processing oil sand to produce a liquid stream comprising water and bitumen and a solid stream comprising solid particles. Finally, the present invention relates to a method for controlling an apparatus for processing oil sand to produce a liquid stream comprising water and bitumen and a solid stream comprising solid particles.

Although the control system may be used with any compatible oil sand processing apparatus, in the preferred embodiment the control system is for use with the apparatus of the present invention. Similarly, although the method may be used for controlling any compatible oil sand processing apparatus, in the preferred embodiment the method is for controlling the apparatus of the present invention.

As discussed above, oil sand is comprised of a matrix of bitumen, solid particles and water. The bitumen is comprised of heavy oil or viscous hydrocarbons which typically behave much like a solid at normal in situ temperatures and which act as a binder for the other components of the oil sand matrix. The solid particles are comprised of mineral matter including sand, rock, silt and clay. Sand and rock are considered to be coarse mineral matter, while clay and silt are considered to be fine mineral matter, where fines are defined as mineral matter having a particular size of less than 44 microns. The water is typically comprised of a film of connate water surrounding the sand in the oil sand matrix, and may also include particles of fine mineral matter.

The apparatus is provided for processing the oil sand to produce a liquid stream comprising water and bitumen and a solid stream comprising solid particles. The liquid stream is comprised of water and bitumen and is typically produced as a "bitumen froth." The bitumen froth will be comprised largely of bitumen, but will also include an amount of water and an amount of fine mineral matter which is not able to be separated from the bitumen during the processing of the oil sand. The solid stream is comprised of solid particles including both fine and course mineral matter.

In a first aspect of the invention in its apparatus form, the invention is comprised of an apparatus for processing oil sand to produce a liquid stream comprising water and bitumen and a solid stream comprising solid particles, the apparatus comprising:

(a) a generally cylindrical drum having a first end, a second end and an interior surface, the drum comprising a conditioning zone adjacent to the first end, a compressing zone adjacent to the second end, and a processing zone between the conditioning zone and the compressing zone;

(b) a rotatable spiral trough extending along the interior surface of the drum through the conditioning zone, the processing zone and the compressing zone, for imparting a spiral rolling motion to the oil sand, the spiral trough having a width, wherein the width of the spiral trough through the compressing zone is less than the width of the spiral trough through the processing zone;

(c) a plurality of lifting members oriented generally transversely within and spaced along the spiral trough, for lifting the oil sand as the spiral trough rotates;

(d) an oil sand inlet, wherein the oil sand inlet communicates with the conditioning zone of the drum;

(e) a liquid stream outlet for the drum located at the first end of the drum;

(f) a water inlet, wherein the water inlet communicates with the processing zone of the drum;

(g) a solid stream outlet for the drum located adjacent to the second end of the drum such that the compressing zone is located between the processing zone and the solid stream outlet; and (h) a drive mechanism for rotating the spiral trough.

In a second aspect of the invention in its apparatus form, the invention is comprised of an apparatus for processing oil sand to produce a liquid stream comprising water and bitumen and a solid stream comprising solid particles, the apparatus comprising:

(a) a generally cylindrical drum having a first end, a second end and an interior surface, the drum comprising a conditioning zone adjacent to the first end, a compressing zone adjacent to the second end, and a processing zone between the conditioning zone and the compressing zone;

(b) a rotatable spiral trough extending along the interior surface of the drum through the conditioning zone, the processing zone and the compressing zone, for imparting a spiral rolling motion to the oil sand, the spiral trough having a height, wherein the height of the spiral trough through at least a portion of the compressing zone is greater than the height of the spiral trough through both the processing zone and the conditioning zone;

(c) a plurality of lifting members oriented generally transversely within and spaced along the spiral trough, for lifting the oil sand as the spiral trough rotates;

(d) an oil sand inlet, wherein the oil sand inlet communicates with the conditioning zone of the drum;

(e) a liquid stream outlet for the drum located at the first end of the drum;

(f) a water inlet, wherein the water inlet communicates with the processing zone of the drum;

(g) a solid stream outlet for the drum located adjacent to the second end of the drum such that the compressing zone is located between the processing zone and the solid stream outlet; and (h) a drive mechanism for rotating the spiral trough.

In a third aspect of the invention in its apparatus form, the invention is comprised of an apparatus for processing oil sand to produce a liquid stream comprising water and bitumen and a solid stream comprising solid particles, the apparatus comprising:

(a) a generally cylindrical drum having a first end, a second end and an interior surface, the drum comprising a conditioning zone adjacent to the first end, a compressing zone adjacent to the second end, and a processing zone between the conditioning zone and the compressing zone;

(b) a rotatable spiral trough extending along the interior surface of the drum through the conditioning zone, the processing zone and the compressing zone, for imparting a spiral rolling motion to the oil sand;

(c) a plurality of lifting members oriented generally transversely within and spaced along the spiral trough, for lifting the oil sand as the spiral trough rotates;

(d) an oil sand inlet, wherein the oil sand inlet communicates with the conditioning zone of the drum;

(e) a liquid stream outlet for the drum located at the first end of the drum;

(f) a water inlet, wherein the water inlet communicates with the processing zone of the drum;

(g) a solid stream outlet for the drum located adjacent to the second end of the drum such that the compressing zone is located between the processing zone and the solid stream outlet, wherein the solid stream outlet is comprised of the drum defining a plurality of perforations in the drum which provide a screen section of the drum, and wherein the perforations are sized so that the solid particles having a size less than or equal to a desired maximum size may exit the drum through the perforations; and (h) a drive mechanism for rotating the spiral trough.

Thus, in all aspects of the present invention in its apparatus form including those specific preferred aspects as noted above, the apparatus is comprised of:

(a) a generally cylindrical drum having a first end, a second end and an interior surface, the drum comprising a conditioning zone adjacent to the first end, a compressing zone adjacent to the second end, and a processing zone between the conditioning zone and the compressing zone;

(b) a rotatable spiral trough extending along the interior surface of the drum through the conditioning zone, the processing zone and the compressing zone, for imparting a spiral rolling motion to the oil sand;

(c) a plurality of lifting members oriented generally transversely within and spaced along the spiral trough, for lifting the oil sand as the spiral trough rotates;

(d) an oil sand inlet, wherein the oil sand inlet communicates with the conditioning zone of the drum;

(e) a liquid stream outlet for the drum located at the first end of the drum;

(f) a water inlet, wherein the water inlet communicates with the processing zone of the drum;

(g) a solid stream outlet for the drum located adjacent to the second end of the drum such that the compressing zone is located between the processing zone and the solid stream outlet; and (h) a drive mechanism for rotating the spiral trough.

Thus, the apparatus provides for countercurrent separation of the oil sand. Specifically, the oil sand is introduced to the conditioning zone adjacent the first end of the drum. The solid particles are transported through the drum by the action of the spiral trough for expulsion through the solid stream outlet adjacent the second end of the drum. Water is introduced through the water inlet to the processing zone between the conditioning zone and the compressing zone adjacent to the second end of the drum. The bitumen is transported through the drum by the movement of the water towards the first end of the drum for expulsion through the liquid stream outlet.

The drum is generally cylindrical to facilitate transport of the solid particles through the drum. The generally cylindrical drum may be constructed of material which is rolled or otherwise formed into a generally cylindrical shape. Alternatively, the generally cylindrical drum may be constructed of flat panels or sheets of a material which are connected together by welding or by some other means to provide a generally cylindrical shape, in which case the number of flat panels or sheets is preferably maximized in order to provide a closer approximation to a cylindrical shape. For example, it is contemplated that about sixteen flat panels or sheets welded together would provide a suitable generally cylindrical shape while reducing the fabrication costs associated with rolling or forming the material into a generally cylindrical shape. More than sixteen or fewer than sixteen flat panels or sheets may, however, be used in similar manner to provide the generally cylindrical shape.

As indicated, the drum includes a conditioning zone, a processing zone and a compressing zone. The oil sand inlet communicates with the conditioning zone which is located at or adjacent to the first end of the drum and. The conditioning zone is provided primarily to permit the oil sand to first contact, or be introduced to, the water in order to commence the liberation and separation of the bitumen from the oil sand within the spiral trough.

The water inlet communicates with the processing zone which is located between the conditioning zone and the compressing zone. The processing zone is provided to agitate the oil sand within the spiral trough and further contact the oil sand with the water in order to enhance the extraction or liberation of the bitumen to provide the separated solids particles comprising the solid stream, while also expelling some of the water from the solid stream moving towards the second end of the drum.

The water inlet may communicate with the processing zone at any position or location therein permitting the processing zone to perform its intended function as described herein. However, preferably, the spiral trough through the processing zone defines a processing zone inlet and a processing zone outlet and wherein the water inlet communicates with the processing zone at a location adjacent to the processing zone outlet. This preferred location of the water inlet is intended to maximize the exposure of the oil sand to the water within the drum by increasing the length or portion of the processing zone which is exposed to the water as the water flows from the water inlet towards the first end of the drum.

The compressing zone is located at or adjacent to the second end of the drum between the processing zone and the solid stream outlet. The compressing zone is provided to compress the oil sand within the spiral trough moving towards the second end to expel any excess or residual water within the solid stream prior to exiting from the drum through the solid stream outlet.

The spiral trough extends through each of the conditioning, processing and compressing zones in order to impart a spiral rolling motion to the oil sand through the drum from the first end towards the second end. The spiral trough may extend along the interior surface of the drum for any desired number of revolutions capable of performing the intended functions of each of the conditioning, processing and compressing zones. Preferably, the spiral trough extends along the interior surface of the drum for between about five and about twenty revolutions of the drum. In the preferred embodiment, the spiral trough extends along the interior surface of the drum for about fourteen revolutions of the drum.

The spiral trough may be rotated in any manner to impart the desired spiral rolling motion to the oil sand and may be rotated by any compatible drive mechanism capable of rotating the spiral trough. For instance, the spiral trough may be adapted to be supported within the drum such that the spiral trough is rotated within, and relative to, the interior surface of the drum. In other words, the drum may remain stationary while the spiral trough is rotated therein. In this instance, the drive mechanism would be operatively connected with the spiral trough.

However, preferably, the spiral trough is fixed to the drum so that rotation of the drum rotates the spiral trough and wherein the drive mechanism rotates the drum. In other words, the drive mechanism is operatively connected with the drum and the drum and the spiral trough are rotated together to impart the spiral rolling motion to the oil sand.

The spiral trough has a width and the width of the spiral trough in each of the conditioning, processing and compressing zones is preferably selected to facilitate or enhance the intended function of that respective zone. In the preferred embodiment, the width of the spiral trough through the compressing zone is less than the width of the spiral trough through the processing zone.

Within the processing zone, the width of the spiral trough is selected, at least in part, to accommodate the amount of water entering the processing zone through the water inlet and such that the solid particles are substantially retained within the spiral trough to minimize the flow of any solid particles within the water towards the first end of the drum.

Within the compressing zone, the width of the spiral trough is selected, at least in part, to compress the oil sand or solid stream within the spiral trough in order to expel any excess or residual water from the solid particles. However, the width is also selected with regard to the anticipated amount of solid particles to be contained or moved within the spiral trough through the compressing zone and the anticipated size of the solid particles within the compressing zone such that the spiral trough is able to accommodate the solid particles therein.

Thus, as a result of the different functions of the processing and compressing zones, the width of the spiral trough through the compressing zone is less than the width of the spiral trough through the processing zone. Additionally, the spiral trough through the compressing zone preferably defines a compressing zone inlet and a compressing zone outlet and wherein the width of the spiral trough at the compressing zone outlet is less than the width of the spiral trough at the compressing zone inlet. As a result, in the direction from the compressing zone inlet towards the compressing zone outlet, the oil sand or solid stream within the spiral trough is increasingly compressed or gradually further compressed in order to facilitate the expulsion of any excess or residual water from the solid particles.

Further, in the preferred embodiment, the width of the spiral trough through the processing zone is less than the width of the spiral trough through the conditioning zone. Within the conditioning zone, the width of the spiral trough is selected to accommodate the amount of oil sand entering the conditioning zone such that the spiral trough is able to substantially accommodate the oil sand therein, while enhancing the contact between the water and the oil sand. Thus, as a result of the different functions of the processing and conditioning zones, the width of the spiral trough through the processing zone is less than the width of the spiral trough through the conditioning zone.

In addition, the spiral trough has a height and the height of the spiral trough in each of the conditioning, processing and compressing zones is also preferably selected to facilitate or enhance the intended function of that respective zone.

In the preferred embodiment, the height of the spiral trough through at least a portion of the compressing zone is greater than the height of the spiral trough through both the conditioning zone and the processing zone. Within the compressing zone, the height of the spiral trough is selected, at least in part, to inhibit or prevent the flow of the liquid stream and any water from the processing zone towards the compressing zone. Specifically, as described, the water enters the processing zone through the water inlet and the resulting liquid stream preferably flows in the direction of the first end of the drum and the liquid stream outlet. Thus, the relative heights of the spiral trough through each of the zones is selected to facilitate the flow of the liquid stream towards the liquid stream outlet. The greater height of the spiral trough in the compressing zone, as compared with both the conditioning zone and the processing zone, prevents or inhibits the undesirable backflow of the liquid stream or flow of the liquid stream towards the solid stream outlet at the second end of the drum.

As well, the liquid stream outlet has a height and wherein the height of the spiral trough through at least a portion of the compressing zone is greater than the height of the liquid stream outlet. The height of the liquid stream outlet is selected, at least in part, for similar reasons as the selection of the relative heights of the spiral trough through the zones. Specifically, the height of the liquid stream outlet is selected to facilitate the flow of the liquid stream away from the compressing zone and towards the liquid stream outlet and to reduce or minimize any undesirable backflow of the liquid stream to the compressing zone.

Additionally, the height of the spiral trough in the compressing zone is selected, in combination with the width, having regard to the anticipated amount of solid particles to be contained or moved within the spiral trough through the compressing zone such that the spiral trough is able to accommodate the solid particles therein for movement in the direction of the sold stream outlet.

As indicated above, the spiral trough through the compressing zone preferably defines a compressing zone inlet and a compressing zone outlet. Preferably, the height of the spiral trough at the compressing zone outlet is greater than the height of the spiral trough at the compressing zone inlet. The increased height of the spiral trough from the compressing zone inlet to the compressing zone outlet further inhibits any undesirable backflow of the liquid stream towards the second end of the drum. As well, given that the width of the spiral trough at the compressing zone outlet is less than the width at the compressing zone inlet, the height of the spiral trough at the compressing zone outlet is preferably greater than the height at the compressing zone inlet in order to permit the spiral trough to accommodate the anticipated amount or quantity of the solid particles or solid stream to be contained therein.

Thus, in the preferred embodiment, the spiral trough in each of the conditioning, processing and compressing zones has a width and a height which are selected together, or having regard to each other, such that the zone is capable of performing its respective intended functions. In other words, the spiral trough has a transverse cross-sectional area. Thus, the cross-sectional area of the spiral trough in each zone is preferably selected such that the zone is capable of performing its intended functions. For instance, in the preferred embodiment, the transverse cross-sectional area of the spiral trough through the compressing zone is preferably less than the transverse cross-sectional area of the spiral trough through the processing zone.

In addition, the drum is preferably further comprised of a froth pooling section located between the first end of the drum and the conditioning zone of the drum. The froth pooling section is preferably configured to permit the liquid stream to further separate prior to exiting the drum through the liquid stream outlet. In other words, any solid particles that may be contained within, or that have been carried along by, the liquid stream are permitted to settle within the froth pooling section and to separate from the water and bitumen, also known as the bitumen froth. As a result, the amount of solid particles carried out through the liquid stream outlet with the bitumen froth may be reduced or minimized. Given the desire to permit the solid particles to separate and settle within the froth pooling section, preferably, the spiral trough does not extend through the froth pooling section.

As indicated, the apparatus includes a plurality of lifting members oriented generally transversely within and spaced along the spiral trough. The lifting members are configured, sized and spaced in each of the zones of the drum to lift the oil sand as the spiral trough rotates. The configuration, sizing and spacing of the lifting members may vary between each of the conditioning, processing and compressing zones, or may be the same through two or more zones, as necessary or desired to permit each zone to perform its respective intended functions.

However, preferably, the lifting members are spaced along the spiral trough so that the lifting members are distributed around the circumference of the interior surface of the drum. Further, the lifting members are preferably distributed at least about every 90 degrees about the circumference. In the preferred embodiment, the lifting members are distributed about every 55 degrees about the circumference through each of the conditioning, processing and compressing zones.

Further, the lifting members have a height and the height of the lifting members in each of the conditioning, processing and compressing zones is preferably selected to facilitate or enhance the intended function of the respective zone. For instance, preferably, the height of the lifting members through the compressing zone is less than the height of the lifting members through the processing zone. The height of the lifting members in the processing zone is selected, at least in part, to contribute to the desired agitation of the oil sand within the spiral trough and contact between the oil sand and the water in order to enhance the extraction or liberation of the bitumen. The height of the lifting members in the compressing zone is selected, at least in part, to move or transport the solid stream towards the solid stream outlet. Less agitation of the oil sand is desirable within the compressing zone.

The apparatus may be further comprised of a drum flocculant inlet communicating with the drum. The drum flocculant inlet is provided for introducing a flocculant to the oil sand as the oil sand is contacted with the water introduced through the water inlet. The flocculant aids or facilitates the agglomeration or precipitation of the fine mineral matter comprising the solid particles. The use of the flocculant may also increase the amount of bitumen which is recovered from the oil sand. Although the drum flocculant outlet may communicate with any zone of the drum, preferably, the drum flocculant inlet communicates with the processing zone of the drum. The drum flocculant inlet may also be combined with the water inlet so that the drum flocculant inlet is comprised of the water inlet. Thus, the oil sand from the oil sand inlet may be contacted and mixed with both the water and the flocculant within the conditioning zone prior to being subjected to further processing.

As well, the drum may be further comprised of a solid particle mixing section for mixing the solid particles contained within the drum with at least one additive, wherein the solid particle mixing section is located between the compressing zone and the second end of the drum. The solid particle mixing section is preferably downstream of the compressing zone, or nearer the second end of the drum than the compressing zone, so that a significant or substantial amount of the water has been expelled from the solid particles by the compressing zone prior to further mixing of the solid particles with the desired additive or additives.

Any additive desired to be mixed with the solid particles to facilitate the further processing of the solid stream or to enhance the desired properties or characteristics of the solid stream may be utilized. Preferably, the additive is comprised of at least one of a flocculant and a sludge. In the preferred embodiment, both a flocculant and a sludge are mixed with the solid particles by the solid particle mixing section.

Thus, in the preferred embodiment, the solid particle mixing section is comprised of a sludge inlet zone and a flocculant inlet zone and the apparatus is further comprised of a mixing section sludge inlet communicating with the sludge inlet zone and a mixing section flocculant inlet communicating with the flocculant inlet zone. Accordingly, the sludge is introduced to the sludge inlet zone via the mixing section sludge inlet, while the flocculant is introduced to the flocculant inlet zone via the mixing section flocculant inlet.

The flocculant inlet zone and the sludge inlet zone may be concurrent in that both the flocculent and the sludge may be introduced to the solid particles at approximately the same time. Alternatively, the flocculant inlet zone and the sludge inlet zone may be disposed or arranged within the solid particle mixing section in any order. However, preferably, the sludge inlet zone is located between the flocculant inlet zone and the second end of the drum. Thus, the flocculant is introduced to, and mixed with, the solid particles prior to introducing and mixing the sludge with the solid particles.

Preferably, the spiral trough extends through the solid particle mixing section. Thus, the spiral trough imparts a spiral rolling motion to the solid particles within the solid particle mixing section in order to facilitate or enhance the mixing of the additives, and particularly the flocculant and the sludge, with the solid particles.

The width of the spiral trough through the solid particle mixing section is selected to facilitate or enhance its intended function. Preferably, the width of the spiral trough through the solid particle mixing section is greater than the width of the spiral trough through the compressing zone of the drum.

Within the solid particle mixing section, the width of the spiral trough is selected, at least in part, to accommodate the solid particles entering the solid particle mixing section from the compressing zone, as well as the amounts of flocculant and sludge entering the solid particle mixing section through the mixing section flocculant inlet and the mixing section sludge inlet. Further, the selected width preferably permits the solid particles to be retained in the spiral trough during the mixing thereof with the flocculent and sludge so that the solid particles are substantially conveyed towards the second end of the drum.

In addition, the height of the spiral trough through the solid particle mixing section is also selected to facilitate or enhance its intended function. Preferably, the height of the spiral trough through the solid particle mixing section is substantially similar to the height of the spiral trough through the compressing zone of the drum.

Within the solid particle mixing section, the height of the spiral trough is selected, at least in part, to further inhibit or prevent the flow of the liquid stream and any water from the processing zone towards the solid particle mixing section. Additionally, the height of the spiral trough in the solid particle mixing section is selected, in combination with the width, having regard to the anticipated amount of solid particles, flocculant and sludge to be conveyed through and mixed within the spiral trough. In other words, the cross-sectional area of the spiral trough in the solid particle mixing section is selected such that the solid particle mixing section is capable of performing its intended function as described herein.

Finally, the lifting members are preferably continued along the spiral trough through the solid particle mixing section. The plurality of lifting members are oriented generally transversely within and spaced along the spiral trough through the solid particle mixing section. The lifting members are configured, sized and spaced in the solid particle mixing section to lift the solid particles as the spiral trough rotates and to facilitate or enhance the intended function of the solid particle mixing section.

The configuration, sizing and spacing of the lifting members in the solid particle mixing sectional may be similar to, or vary from, that of the lifting members in any or all of the conditioning, processing and compressing zones of the drum. Preferably, the configuration, sizing and spacing of the lifting members in the solid particle mixing section are substantially similar to the configuration, sizing and spacing of the lifting members in the compressing zone.

Thus, in the preferred embodiment, the lifting members are distributed about every 55 degrees about the circumference of the interior surface of the drum through the solid particle mixing section. Further, the height of the lifting members through the solid particle mixing section is substantially similar to the height of the lifting members through the compressing zone.

The solid stream outlet may be comprised of any structure or mechanism suitable for expelling or discharging the solid stream from the drum. For instance, the solid stream outlet may be defined by or comprised of any portion or component of the drum. As well, the solid stream outlet may be comprised of a single outlet or discharge mechanism such that all of the solid particles are discharged concurrently. Alternately, the solid stream outlet may be comprised of a plurality of outlets or discharge mechanisms such that the solid particles are sorted or separated in some manner prior to being discharged. In the preferred embodiment, the solid particles are sorted or separated according to particle size prior to being discharged or expelled through the solid stream outlet.

In particular, the solid stream outlet is preferably comprised of the drum defining a plurality of perforations in the drum which provide a screen section of the drum, and wherein the perforations are sized so that the solid particles having a size less than or equal to a desired maximum size may exit the drum through the perforations. In addition, the solid stream outlet is further comprised of an oversized particle outlet located at the second end of the drum whereby the solid particles having a size greater than the desired maximum size may exit the drum through the oversized particle outlet. Oversized particles from the oversized particle outlet may be directed to the same location as other solid particles from the solid stream outlet, or may be directed to a different location.

Preferably, the spiral trough extends through the screen section of the drum. The spiral trough imparts a spiral rolling motion to the solid particles within the screen section in order to facilitate and enhance the sorting and exiting through the perforations of the solid particles having a size less than or equal to the desired maximum size. Further, the action of the spiral trough also facilitates the exiting of the solid particles having a size greater than the desired maximum size through the oversized particle outlet.

The width and the height, and thus the cross-sectional area, of the spiral trough through the screen section are selected to facilitate or enhance its intended function. Thus, within the screen section, the width and the height of the spiral trough are selected, at least in part, to be capable of conveying the solid particles therethrough, while permitting the different sized particles to exit from either the perforations of the screen section or the oversized particle outlet at the second end of the drum.

Preferably, the width of the spiral trough through the screen section is about the same as or less than the width of the spiral trough through the immediately preceding zone or section of the drum. For instance, if a solid particle mixing section is present, the width of the spiral trough through the screen section is preferably less than the width of the spiral trough through the solid particle mixing section. If a solid particle mixing section is not present, the width of the spiral trough through the screen section is about the same as the width of the spiral trough through at lest a portion of the compressing zone.

The height of the spiral trough through the screen section is preferably less than the height of the spiral trough through the immediately preceding zone or section of the drum, being either the compressing zone of the drum or the solid particle mixing section. The decreased height of the spiral trough tends to facilitate the movement of the solid particles through the screen section.

Further, in order to facilitate the sorting of the particles sizes and exiting through either the screen section or the oversized particle outlet, preferably, the lifting members are not provided in the screen section of the drum. Lifting of the solid particles would tend to interfere with or impede the intended function of the solid stream outlet, and particularly the screen section.

As indicated, the drum may or may not be comprised of the solid particle mixing section. Where the drum does not include a solid particle mixing section, the screen section is located adjacent the compressing zone of the drum. Where the drum is further comprised of a solid particle mixing section for mixing the solid particles contained within the drum with at least one additive, the solid particle mixing section is located between the compressing zone and the screen section of the drum. In this case, the sludge inlet zone is located between the flocculant inlet zone and the screen section of the drum.

As indicated previously, in a further aspect of the invention, the invention relates to a control system for an apparatus for processing oil sand to produce a liquid stream comprising water and bitumen and a solid stream comprising solid particles. Preferably, the control system is for the apparatus of the invention as described herein, and preferably is provided for the preferred embodiment of the apparatus.

Further, in a final aspect of the invention, the invention relates to a method for controlling an apparatus for processing oil sand to produce a liquid stream comprising water and bitumen and a solid stream comprising solid particles. As with the control system, the controlling method is preferably provided for controlling the apparatus of the invention as described herein, and more preferably is provided for controlling the preferred embodiment of the apparatus.

More particularly, in the aspect of the invention related to the control system, the invention is comprised of a control system for an apparatus for processing oil sand to produce a liquid stream comprising water and bitumen and a solid stream comprising solid particles, wherein the apparatus is comprised of a generally cylindrical rotatable drum, a spiral trough extending along an interior surface of the drum, an oil sand feed mechanism, a drive mechanism for rotating the drum, a first drum support for supporting the drum, and a second drum support for supporting the drum, wherein the drum is comprised of a first end, a second end, an oil sand inlet located adjacent to the first end, and a solid stream outlet located adjacent to the second end, wherein the first drum support is located between the first end of the drum and a midpoint of the drum, and wherein the second drum support is located between the second end of the drum and the midpoint of the drum, the control system comprising:

(a) a first drum load sensor associated with the first drum support, for sensing a first drum load exerted on the first drum support;
(b) a second drum load sensor associated with the second drum support, for sensing a second drum load exerted on the second drum support;
(c) an oil sand feedrate sensor associated with the oil sand feed mechanism, for sensing a feedrate of the oil sand feed mechanism;
(d) a controller operatively connected with the first drum load sensor, the second drum load sensor, the oil sand feedrate sensor, the drive mechanism and the oil sand feed mechanism, for controlling a rotation speed of the drum and a feedrate of the oil sand feed mechanism in response to input data from the first drum load sensor, the second drum load sensor and the oil sand feedrate sensor.

Further, in the aspect of the invention related to the controlling method, the invention is comprised of a method for controlling an apparatus for processing oil sand to produce a liquid stream comprising water and bitumen and a solid stream comprising solid particles, wherein the apparatus is comprised of a generally cylindrical rotatable drum, a spiral trough extending along an interior surface of the drum, an oil sand feed mechanism, a drive mechanism for rotating the drum, a first drum support for supporting the drum, and a second drum support for supporting the drum, wherein the drum is comprised of a first end, a second end, an oil sand inlet located adjacent to the first end, and a solid stream outlet located adjacent to the second end, wherein the first drum support is located between the first end of the drum and a midpoint of the drum, and wherein the second drum support is located between the second end of the drum and the midpoint of the drum, the method comprising:

(a) sensing a first drum load exerted on the first drum support;
(b) sensing a second drum load exerted on the second drum support;
(c) sensing a feedrate of the oil sand feed mechanism; and
(d) controlling a rotation speed of the drum and a feedrate of the oil sand feed mechanism in response to input data from the first drum load sensing step, the second drum load sensing step and the feedrate sensing step.

As indicated, the apparatus includes an oil sand feed mechanism and a drive mechanism for rotating the drum. The oil sand feed mechanism may be comprised of any mechanism or device capable of feeding or delivering the oil sand to the drum at a desired feedrate. The drive mechanism may be comprised of any mechanism or device capable of rotating the drum at a desired rotation speed.

Further, the apparatus includes a first drum support for supporting the drum and a second drum support for supporting the drum. More particularly, a first drum load is exerted on the first drum support, while a second drum load is exerted on the second drum support. The first and second drum supports are located a spaced distance apart between the first end and the second end of the drum. The drive mechanism may be located at any position relative to the first and second drum supports. However, preferably, the drive mechanism is positioned between the first drum support and the second drum support.

Further, the first and second drum supports may be located at any positions along the length of the drum between the first and second ends which are capable of supporting the drum in the desired manner and which permit the proper functioning of the first and second drum load sensors of the control system or the proper performance of the first and second drum load sensing steps of the controlling method. However, preferably, the first drum support is located between the first end of the drum and a midpoint of the drum, and wherein the second drum support is located between the second end of the drum and the midpoint of the drum.

In the controlling method, the method includes a number of sensing steps in order to obtain input data for the controlling step such that the input data is utilized to adjust or control the rotation speed of the drum and the feedrate of the oil sand feed mechanism in order to produce a desired solid stream and a desired liquid stream. The sensing steps may be performed in any suitable manner and by any suitable mechanism or device capable of sensing the desired parameter and providing the resulting data for performance of the controlling step. However, preferably, the controlling method is performed utilizing the control system of the invention. Thus, the sensing steps are performed utilizing the sensors of the control system.

Thus, the control system includes a number of sensors which provide input data to the controller, whereby the controller utilizes the input data to adjust or control the rotation speed of the drum and the feedrate of the oil sand feed mechanism in order to produce a desired solid stream and a desired liquid stream. Any conventional sensors or sensing apparatuses or devices may be utilized which are capable of, and suitable for, sensing the desired parameter and providing the desired input data.

Accordingly, the controlling method includes the step of sensing the first drum load exerted on the first drum support. In the control system, a first drum load sensor is associated with the first drum support for sensing the first drum load exerted on the first drum support.

Further, the controlling method includes the step of sensing the second drum load exerted on the second drum support. Similarly, in the control system, a second drum load sensor is associated with the second drum support for sensing the second drum load exerted on the second drum support.

As well, the controlling method includes the step of sensing the feedrate of the oil sand feed mechanism. In the control system, an oil sand feedrate sensor is associated with the oil sand feed mechanism for sensing the feedrate of the oil sand feedrate mechanism.

Finally, the controlling method includes the step of controlling the rotation speed of the drum and the feedrate of the oil sand feed mechanism in response to input data from the first drum load sensing step, the second drum load sensing step and the feedrate sensing step. In the control system, the controller is operatively connected with the first drum load sensor, the second drum load sensor, the oil sand feedrate sensor, the drive mechanism and the oil sand feed mechanism. Thus, in response to the input data from each of the first drum load sensor, the second drum load sensor and the oil sand feedrate sensor, the controller may adjust one or both of the drum rotation speed and the oil sand feed mechanism feedrate.

Both the controlling step and the controller control or adjust one or both of the rotation speed of the drum and the feedrate of the oil sand feed mechanism in order to maintain or achieve desired properties of both the solid stream and the liquid stream. More particularly, a density of the solid stream at the solid stream outlet is preferably maintained at or above a minimum design density. In addition, a concentration of the solid particles in the liquid stream is maintained at or below a maximum design concentration.

In other words, the drum rotation speed and the feed rate are adjusted such that a desired amount or percentage of the solid particles in the oil sand comprise the solid stream and are being discharged at the solid stream outlet, rather than comprising the liquid stream and being discharged at the liquid stream outlet. However, a balance is required to be achieved between the density of the solid stream and the concentration of the solid particles in the liquid stream. In particular, it has been found that an increase in the density of the solid stream greater than a desired maximum density will result in an undesirable increase in the concentration of the solid particles in the liquid stream.

Thus, in the controlling method, the controlling step is performed so that a density of the solid stream at the solid stream outlet is maintained at or above a minimum design density and so that a concentration of the solid particles in the liquid stream is maintained at or below a maximum design concentration. In the control system, the controller is configured so that a density of the solid stream at the solid stream outlet is maintained at or above a minimum design density and so that a concentration of the solid particles in the liquid stream is maintained at or below a maximum design concentration.

In order to operate the apparatus efficiently, the controlling step is preferably performed so that the feedrate of the oil sand feed mechanism is maximized. Similarly, the controller is preferably configured to maximize the feedrate of the oil sand feed mechanism. It has been found that the greater the feedrate of the oil sand, or the higher the solids loading within the drum, the greater the bitumen recovery in the liquid stream. In this regard, it has been found that the residence time of the oil sand within the drum is not critical to the recovery of bitumen within the liquid stream.

Further, it has been found that the feed rate of the oil sand and the rotation speed of the drum are proportional. Accordingly, if the feedrate of the oil sand feed mechanism is increased, the drum rotational speed is required to be increased proportionately in order for the apparatus to operate in the desired manner and to permit the drum to convey the oil sand therethrough for processing without any significant back-up of the oil sand in the drum.

Thus, to increase the feedrate, the rotation speed of the drum must be also be increased. However, as the drum speed increases, the density of the solid stream at the solid stream outlet tends to decrease. Conversely, as the drum speed decreases, the density of the solid stream tends to increase. Thus, although it is desirable to maximize the feedrate of the oil sand feed mechanism, a balance is required to be achieved between the feedrate of the oil sand feed mechanism and the rotation speed of the drum in order to achieve a desired density of the solid stream.

Further, as discussed above, the rotation speed of the drum must be maintained at a speed which permits the drum to convey the oil sand through the drum in a desired manner for processing without any significant back-up of the oil sand in the drum.

For instance, in the preferred embodiment, the drum is comprised of a processing zone, wherein the spiral trough extends through the processing zone and wherein the spiral trough has a height through the processing zone. Preferably, the controller is configured so that the oil sand which passes through the processing zone is substantially contained in the spiral trough below the height of the spiral trough. Similarly, the controlling step is performed so that the oil sand which passes through the processing zone is substantially contained in the spiral trough below the height of the spiral trough. In other words, it is desirable that the oil sand be substantially contained within the spiral trough in order to enhance the processing of the oil sand within the processing zone and to minimize the amount or percentage of solid particles moving within the liquid stream towards the first end of the drum. Rather, the oil sand is processed and the solid particles are substantially moved by the spiral trough towards the second end of the drum.

Further, in the preferred embodiment, the drum is comprised of a compressing zone, wherein the spiral trough extends through the compressing zone and wherein the spiral trough has a height through the compressing zone. Preferably, the controller is configured so that the solid stream which passes through the compressing zone is substantially contained in the spiral trough below the height of the spiral trough. Similarly, the controlling step is preferably performed so that the solid stream which passes through the compressing zone is substantially contained in the spiral trough below the height of the spiral trough. In other words, it is again desirable that the solid stream be substantially contained within the spiral trough in order to enhance the compressing of the solid stream to expel any excess or residual water therefrom while minimizing the amount or percentage of solid particles contained within the water and forming a part of the liquid stream flowing towards the first end of the drum. Rather, the compressed solid particles forming the solid stream are preferably substantially moved by the spiral trough towards the second end of the drum.

Finally, as indicated, the drum rotation speed and feedrate controlling step of the method is performed in response to input data from the first drum load sensing step, the second drum load sensing step and the feedrate sensing step. Similarly, the controller of the control system adjusts the drum rotation speed and the oil sand feed mechanism feedrate in response to the input data from each of the first drum load sensor, the second drum load sensor and the oil sand feedrate sensor.

The oil sand feedrate sensor and the feedrate sensing step provide data relating to the actual feedrate of the oil sand feed mechanism. The first drum load sensor and the first drum load sensing step provide data relating to the first drum load exerted on the first drum support. The second drum load sensor and the second drum load sensing step provide data relating to the second drum load exerted on the second drum support. In operation, the apparatus provides a desired or optimum weight distribution between the first drum support and the second drum support. Thus, the controller or controlling step preferably adjusts the drum rotation speed and the oil sand feedrate in response to a change in either the first drum load or the second drum load.

In operation, an increase in the first drum load is typically indicative of a back-up of the oil sand within the drum. Accordingly, the drum rotation speed and/or the oil sand feedrate may need to be adjusted to obtain a desired movement or flow of the oil sand and the solid stream within the drum. In particular, the drum rotation speed may be increased and/or the oil sand feedrate may be decreased.

A decrease in the second drum load is typically indicative of a decrease in the density of the solid stream. Thus, assuming that the apparatus is operating at parameters providing a desired or optimum density, a decrease in the second drum load will indicate a decrease in the density below the desired or optimum solid stream density. Accordingly, the drum rotation speed and/or the oil sand feedrate may need to be adjusted to increase the solid stream density. In particular, the drum rotation speed may be decreased and/or the oil sand feedrate may be increased.

In practice, the desired or optimum density of the solid stream at the solid stream outlet is predetermined and utilized as a "set point" during the operation of the apparatus. The "set point" is predetermined taking into account the desired minimum density of the solid stream and the desired maximum concentration of the solid particles in the liquid stream. Further, the desired feedrate of the oil sand feed mechanism is also selected taking into account the density set point. The rotation speed of the drum is then adjusted during operation of the apparatus in response to a change in the first and second drum loads in order to achieve or maintain the density of the solid stream at the solid stream outlet at the set point.

Thus, the controlling method and control system utilizes three parameters in order to achieve the desired result, being the feedrate of the oil sand feed mechanism, the rotation speed of the drum and the drum loads exerted on the first and second drum supports.

SUMMARY OF DRAWINGS

Embodiments of the invention will now be described with reference to the accompanying drawings, in which.

DETAILED DESCRIPTION

Figure 1:
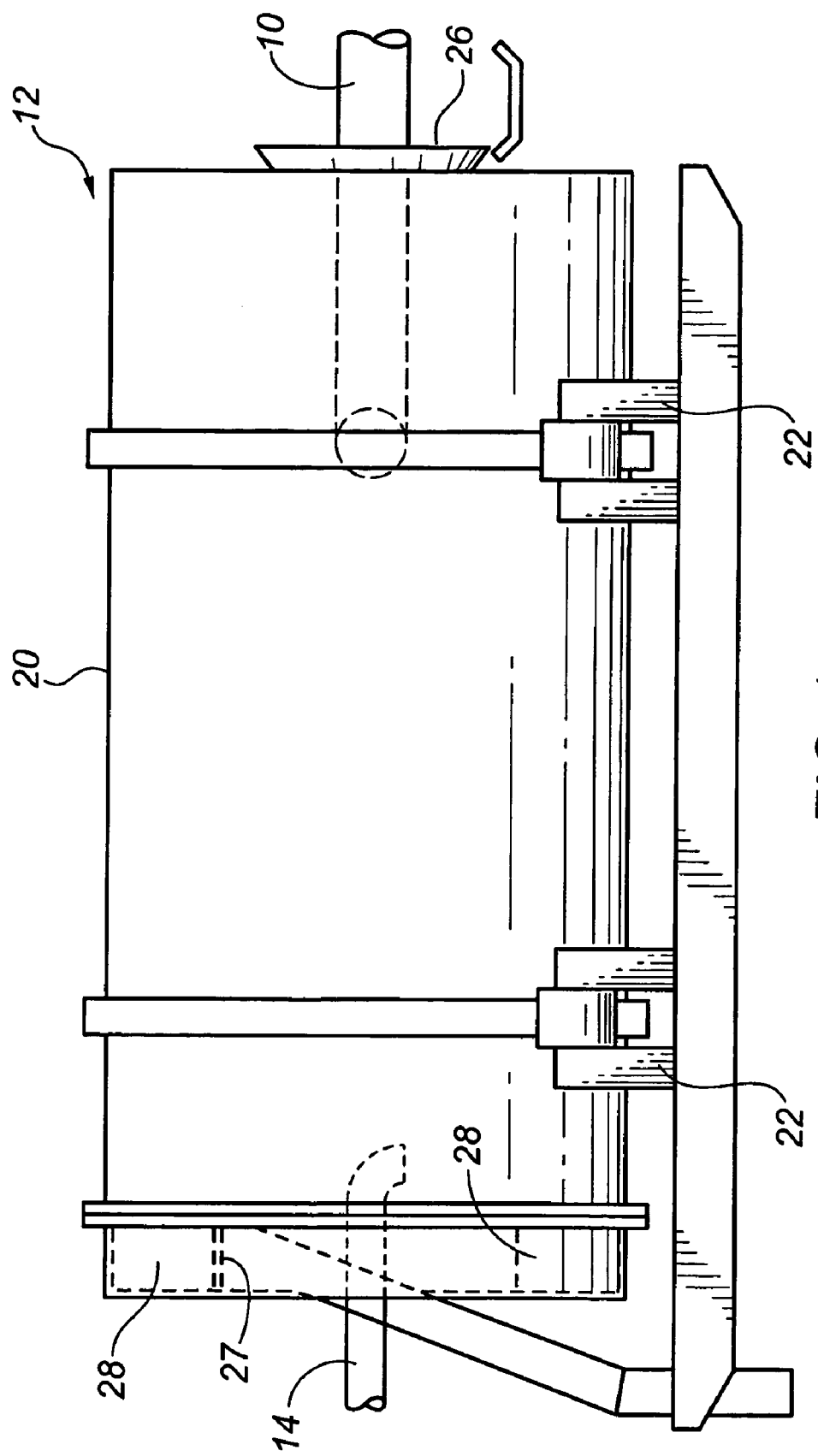
FIG. 1 is a side view of an embodiment of a separation apparatus shown in the prior art.
Figure 2:
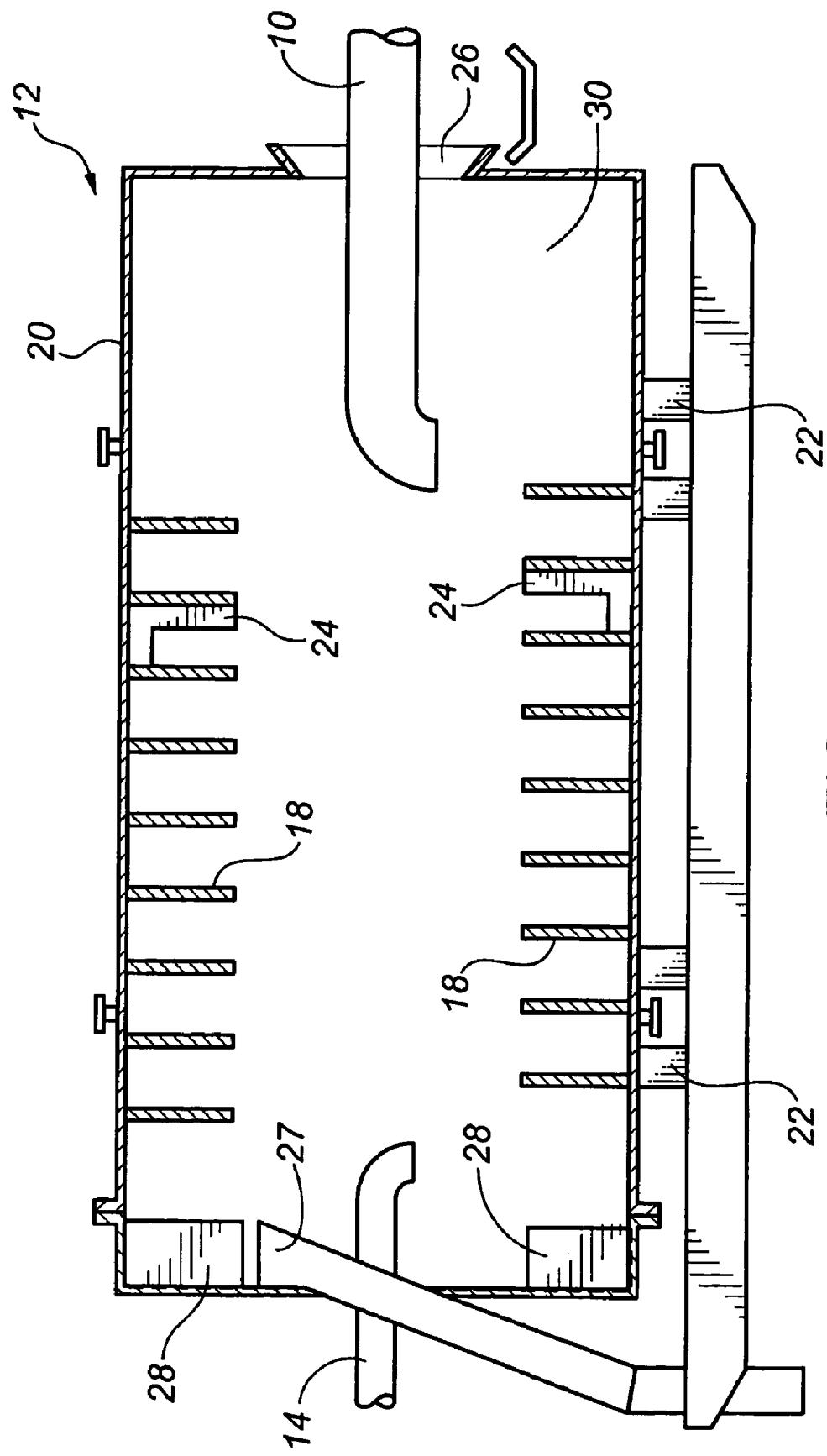
FIG. 2 is a longitudinal sectional view of the embodiment of the separation apparatus of FIG. 1 shown in the prior art.

FIGS. 1-2 show a countercurrent separator vessel (12) as previously utilized in Canadian Patent No. 2,123,076 issued Nov. 17, 1998 to Strand et. al. in the performance of the method described therein. Referring to FIGS. 1 and 2, lumps of oil sand are fed to one end of the countercurrent separator (12) via a conveyor line (10) which extends into the separator (12) at least far enough so that the oil sand can be guided to the start of a spiral ribbon (18) associated with the separator (12). Warm water is fed to the opposite end of the separator (12) via a warm water line (14).

The separator (12) comprises a drum (20) which is mounted on rollers (22) for rotation about a horizontal axis, and which is driven by drive means well known in the art. The spiral ribbon (18) is fixed to the inside of the drum (20) and includes a number of separate flights. Also associated with the drum (20) are a number of lifters (24) which consist of flat blades mounted on the interior of the drum (20) essentially perpendicular to the flights of the spiral ribbon (18). The height of the spiral ribbon (18) is the same throughout the length of the drum (20). Further, the height of the lifters (24) corresponds with the height of the spiral ribbon (18) such that the height of the lifters (24) is also the same throughout the length of the drum (20). Finally, the distance between the flights of the spiral ribbon (18), which may also be referred to as either the width of the spiral ribbon (18) or the pitch of the spiral ribbon (18), is also the same throughout the length of the drum (20).

The separator (12) is equipped with a warm water discharge opening (26) from which warm water containing bitumen and dispersed fine material are withdrawn from the separator (12), which warm water discharge opening (26) is at the opposite end of the separator (12) from the warm water line (14). The separator (12) also has a solid material discharge opening (27) at the opposite end of the separator (12) from the conveyor line (10), and which is fed by a number of draining pockets (28), which lift the solid material out of the bath to partially drain it before discharging the solid material from the separator (12). Finally, the separator (12) is also equipped with a settling zone (30) adjacent the warm water discharge opening (26) which permits solid material to settle to the bottom of the separator (12) before the warm water exits the separator (12).

Referring to FIGS. 3-10, the present invention relates to an apparatus (32) for processing oil sand to produce a liquid stream (34) comprising water and bitumen and a solid stream (36) comprising solid particles, a control system (38) for the apparatus (32) and a method for controlling the apparatus (32). In the preferred embodiment, the apparatus (32) is intended to be used in substitution for the countercurrent separator vessel (12).

Figure 3:
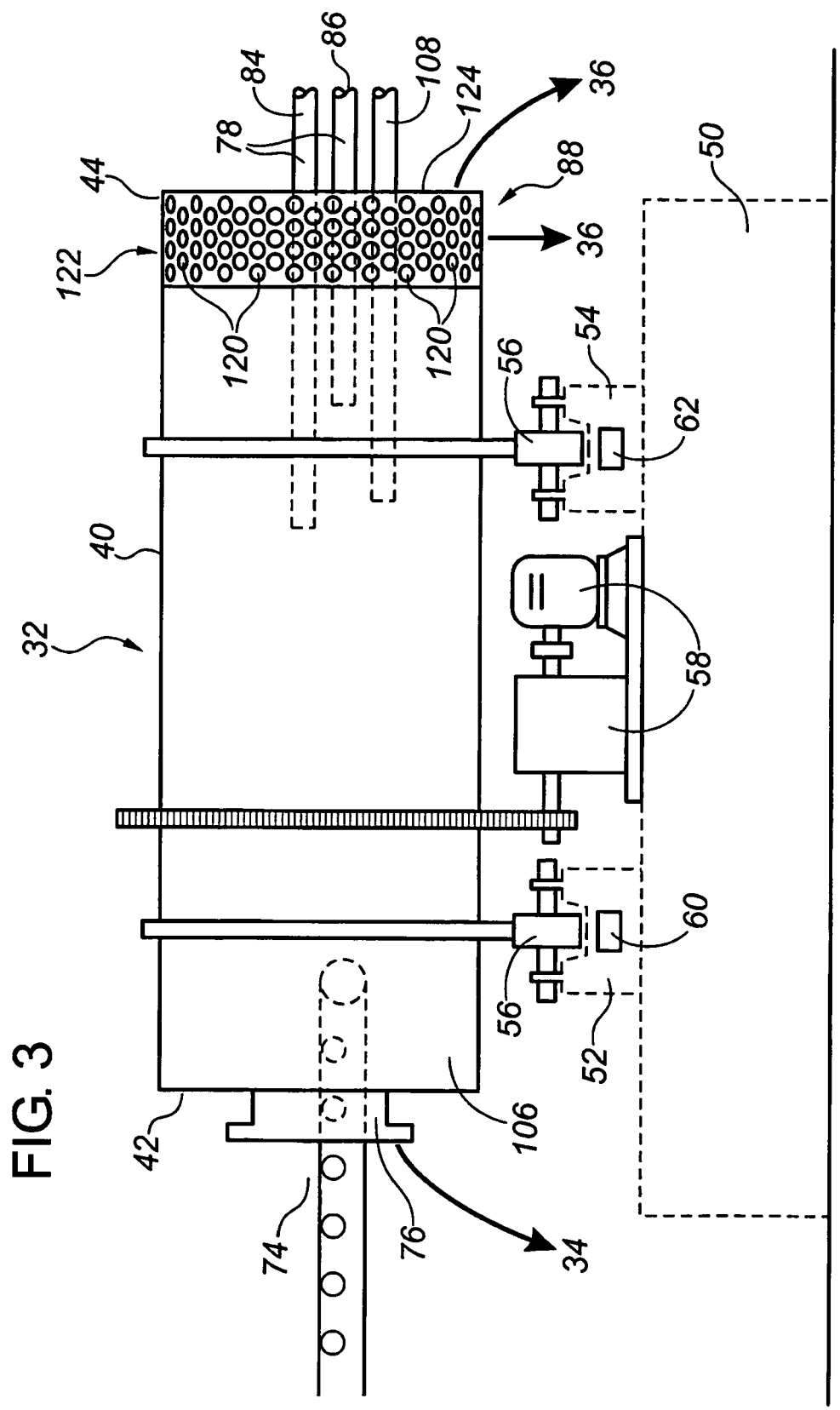
FIG. 3 is a side view of a preferred embodiment of an apparatus of the invention comprising a drum and a screen section.
Figure 8:
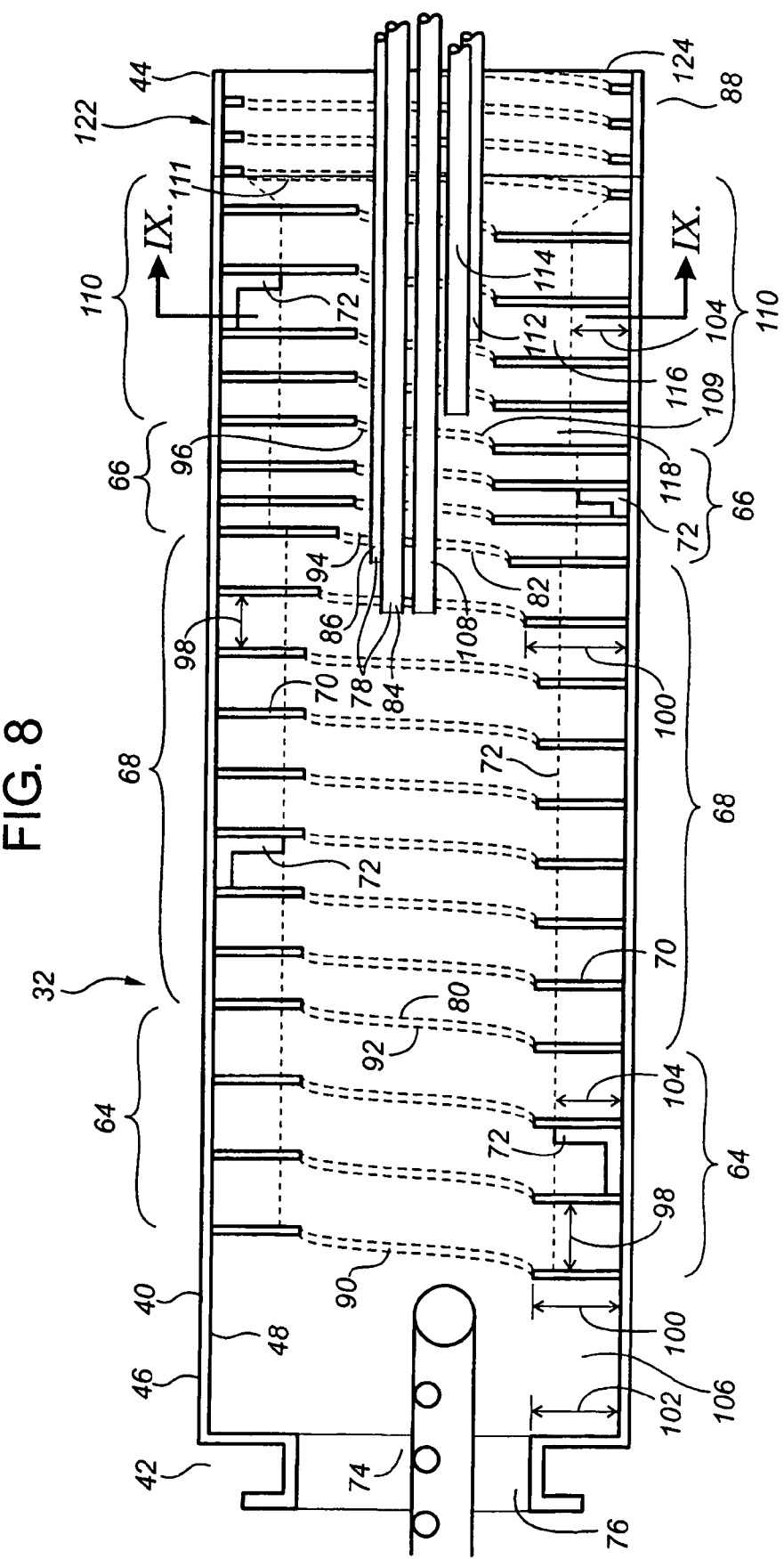
FIG. 8 is a longitudinal sectional view of the apparatus shown in FIG. 7.

Further, in the preferred embodiment, the apparatus (32) is intended to be used in the performance of the oil sand extraction process as described and shown in the flow chart of FIG. 1 of Canadian Patent No. 2,123,076 issued Nov. 17, 1998 to Strand et. al. In particular, the apparatus (32) as shown in FIG. 3 herein may be used to perform the functions of the vessel (12) described in Canadian Patent No. 2,123,076. Further, the apparatus (32) as shown in FIG. 8 herein may be used to perform the functions of both the vessel (12) and the mixing drum of Canadian Patent No. 2,123,076, wherein the mixing drum is referred to by reference numeral "36" and is particularly shown in FIG. 4 of Canadian Patent No. 2,123,076.

In the preferred embodiment, the oil sand is comprised of a matrix of bitumen, solid particles and water. The bitumen is comprised of heavy oil or viscous hydrocarbons. The solid particles are comprised of mineral matter including coarse mineral matter, such as sand and rock, and fine mineral matter such as silt and clay. Thus, following processing of the oil sand by the apparatus (32), the liquid stream (34) is produced which is comprised of water and bitumen and which may also be referred to as a "bitumen froth." The liquid stream (34) may also include an amount of fine mineral matter which is not able to be separated from the bitumen during the processing of the oil sand. Further, the solid stream (36) is produced by the apparatus (32) which is comprised of solid particles including both fine and course mineral matter.

Thus, the oil sand entering the apparatus (32) is comprised of an amount or percentage of solid particles. Preferably, a greater amount or percentage of those solid particles exits through the solid stream (36) as compared with the liquid stream (34). More particularly, the amount or percentage of the solid particles comprising the solid stream (36) is maximized, while the amount or percentage of the solid particles comprising the liquid stream (34) is minimized. In the preferred embodiment, based upon the assumptions that the oil sand entering the apparatus (32) is comprised of 100% of the solid particles and that an amount of water will be lost during processing by the apparatus (32), the solid stream (36) exiting the apparatus (32) is typically comprised of between about 85-90% of the solid particles. Conversely, the liquid stream (34) exiting the apparatus (32) is typically comprised of between about 70-80% water, between about 10-15% bitumen and between about 10-15% of the solid particles.

Referring to FIGS. 3-9, the apparatus (32) is comprised of a generally cylindrical drum (40) having a first end (42) and an opposed second end (44), and further having an exterior surface (46) and an interior surface (48). The drum (40) may include a drain (not shown) if desired for maintenance purposes. Further, the drum (40) is preferably mounted with a platform (50) such that the drum (40) is rotatable about a longitudinal axis extending between the first and second ends (42, 44). The drum (40) may be rotatably mounted with the platform (50) by any support structure or support mechanism permitting the rotation of the drum (40) about it longitudinal axis. However, in the preferred embodiment, the apparatus (32) is comprised of a first drum support (52) for supporting the drum (40) and a second drum support (54) for supporting the drum (40). Preferably, each of the first and second drum supports (52, 54) is comprised of one or more rollers (56) such that the drum (40) is rotatably supported thereby.

Further, the apparatus 32) is comprised of a drive mechanism (58) which is operably connected or mounted with the drum (40) for rotating the drum (40) about its longitudinal axis while supported by the first and second drum supports (52, 54). Any conventional or known drive mechanism may be used which is capable of rotating the drum (40) at a desired rotation speed. In the preferred embodiment, the drive mechanism (58) is associated with the exterior surface (46) of the drum (40). For instance, as shown in FIG. 3, a drive motor and gear system may be utilized to drive a gear operatively engaged or mounted about the exterior surface (46) of the drum (40).

The drum (40) is mounted with the platform (50) and rotatably supported by the first and second drum supports (52, 54) such that a desired weight distribution between the supports (52, 54) is achieved. Thus, a first drum load is exerted on the first drum support (52), while a second drum load is exerted on the second drum support (54). To distribute the drum load or weight of the drum (40), the first and second drum supports (52, 54) are a spaced apart along a length of the drum (40) between the first end (42) and the second end (44) of the drum (40). Further, the drive mechanism (58) is preferably positioned between the first and second drum supports (52, 54). More preferably, the first drum support (52) is located between the first end (42) of the drum (40) and a midpoint of the drum (40). Further, the second drum support (54) is located between the second end (44) of the drum (40) and the midpoint of the drum (40). The midpoint of the drum (40) is about the middle of the drum (40) longitudinally or about equidistant between the first and second ends (42, 44).

Further, as described further below, the control system (38) includes a first drum load sensor (60) and a second drum load sensor (62). Any known or conventional load sensors or load cells may be utilized which are compatible with and suitable for sensing the necessary drum load. Preferably, the first drum load sensor (60) is associated with the first drum support (52) for sensing the first drum load. Similarly, the second drum load sensor (62) is associated with the second drum support (54) for sensing the second drum load.

In addition, the drum (40) is preferably comprised of a conditioning zone (64) adjacent to the first end (42), a compressing zone (66) adjacent to the second end (44), and a processing zone (68) between the conditioning zone (64) and the compressing zone (66). As described further below, each of the zones is provided for performing a different function as the oil sand passes through the drum (40) from the first end (42) towards the second end (44).

As well, the apparatus (32) is comprised of a rotatable spiral trough (70) which extends along the interior surface (48) of the drum (40). Preferably, the spiral trough (70) is fixed to the interior surface (48) of the drum (40) so that rotation of the drum (40) by the drive mechanism (58) rotates the spiral trough (70). The spiral trough (70) is provided for imparting a spiral rolling motion to the oil sand within the drum (40). Preferably, the spiral trough (70) extends through each of the conditioning zone (64), the processing zone (68) and the compressing zone (66).

The spiral trough (70) may extend along the interior surface (48) of the drum (40) for any total number of revolutions, through each of the zones (64, 68, 66), which is capable of performing the intended functions of each of the conditioning, processing and compressing zones (64, 68, 66). Preferably, the spiral trough (70) extends along the interior surface (48) of the drum (40), and through each of the zones (64, 68, 66), for a total of between about five and twenty revolutions of the drum (40). In the preferred embodiment, the spiral trough (70) extends for a total of about fourteen revolutions of the drum (40) through each of the zones (64, 68, 66).

The number of revolutions of the spiral trough (70) in each of the zones (64, 68, 66) may also vary depending upon the function or purpose being performed by the respective zone. In the preferred embodiment, the conditioning zone (64) includes about three revolutions of the drum (40), the processing zone (68) includes about 8 revolutions of the drum (40) and the compressing zone (66) includes about three revolutions of the drum (40).

In order to facilitate or enhance the spiral rolling motion imparted to the oil sand by the spiral trough (70), the apparatus (32) preferably further includes a plurality of lifting members (72) or lifters for lifting the oil sand as the spiral trough (70) rotates. The lifting members (72) are preferably oriented generally transversely within and spaced along the spiral trough (70). Thus, the lifting members (72) are aligned longitudinally, or along the longitudinal axis of the drum (40), and radially about the drum (40).

The lifting members (72) may be spaced along the spiral trough (70) at any distance apart, or may be distributed about the circumference of the interior surface (48) of the drum (40) at any intervals, permitting the lifting member (72) to perform its function. Preferably, the lifting members (72) are distributed at least about every 90 degrees about the circumference of the interior surface (48) of the drum (40). However, it has been found that if the lifting members (72) are distributed in a manner permitting the lifting members (72) to "line up" that the drive mechanism (58), and in particular the drive motor, may experience undesirable surge loading. Thus, in the preferred embodiment, the lifting members (72) are distributed about every 55 degrees, as shown by reference "A" in FIG. 6, about the circumference of the interior surface (48) through each of the conditioning, processing and compressing zones (64, 68, 66).

Further, the apparatus (32) includes a number of inlets and outlets for providing the desired countercurrent separation of the oil sand within the drum (40). In particular, the apparatus (32) is comprised of an oil sand inlet (74) for supplying the oil sand feedstock or raw oil sand to the drum (40). Prior to supplying the oil sand to the drum (40), the oil sand may be prepared by breaking the lumps of oil sand into a desirable size compatible for processing by the apparatus (32). For instance, the oil sand may be first subjected to a conventional oil sand feeder breaker or other size limiting device as described in Canadian Patent No. 2,123,076.

Preferably, the oil sand inlet (74) communicates with the conditioning zone (64) of the drum (40). Although the oil sand inlet (74) may communicate with the conditioning zone (64) in any manner, preferably, the oil sand inlet (74) extends through the first end (42) of the drum (40) to a location adjacent the conditioning zone (64). More preferably, the oil sand inlet (74) extends to the first revolution of the spiral trough (70), nearest the first end (42) of the drum, which comprises the conditioning zone (64). This preferred location of the oil sand inlet (74) is intended to maximize the exposure of the oil sand to the conditioning zone (64) by increasing the length or portion of the conditioning zone (64) to which the oil sand is exposed as it moves towards the second end (44) of the drum (40).

Further, the oil sand inlet (74) may be comprised of any suitable conduit, pipe or conveyance device capable of conveying or transporting the oil sand to the conditioning zone (64). However, preferably, the oil sand inlet (74) is comprised of an apron feeder. Further, the oil sand inlet (74) is associated with an oil sand feed mechanism (73) for feeding or supplying the oil sand at a desired feedrate to the oil sand inlet (74). The oil sand feed mechanism (73) may be any solids conveyor or feed mechanism or device capable of conveying the oil sand feedstock to the oil sand inlet (74) at a desired feedrate.

As well, the control system (38) includes an oil sand feedrate sensor (75). Any known or conventional sensor may be used which is compatible with and suitable for sensing the feedrate of the oil sand to the oil sand inlet (74). Thus, the oil sand feedrate sensor (75) is preferably associated with the oil sand feed mechanism (73) for sensing the feedrate of the oil sand feedrate mechanism (73).

As well, the apparatus (32) is comprised of a liquid stream outlet (76) for the drum (42). Preferably, the liquid stream outlet (76) is also located at or adjacent the first end (42) of the drum (40). The liquid stream outlet (76) is provided for discharging the liquid stream (34) from the drum (40) or for conducting the liquid stream (34) out of the drum (40) for further processing. For instance, as described further below, the liquid stream (34) may be further processed to provide an amount of water for recycling to the drum (40) and/or to provide an amount of a sludge for return to the apparatus (32).

Further, the liquid stream outlet (76) may be comprised of any suitable conduit, pipe or discharge device capable of discharging or expelling the liquid stream (34) from the drum (40). However, preferably, the liquid stream outlet (76) is comprised of the first end (42) of the drum (40) defining a discharge opening which is sized and positioned to provide a gradient such that the flow of the liquid stream (34) towards the liquid stream outlet (76), and the discharge of the liquid stream (34) from the liquid stream outlet (76), are facilitated thereby.

The apparatus (32) is further comprised of a water inlet (78) for supplying water to the drum (40). Preferably, the water inlet (78) communicates with the processing zone (68) of the drum (40). Although the water inlet (78) may communicate with the processing zone (68) in any manner, preferably, the water inlet (78) extends through the second end (44) of the drum (40) to a location within the processing zone (68). More preferably, the water inlet (78) extends to a location within the processing zone (68) adjacent or in proximity to the last or final revolution of the spiral trough (70), nearest to the second end (44) of the drum (40), which comprises the processing zone (68).

More particularly, the spiral trough (70) through the processing zone (68) preferably defines a processing zone inlet (80), nearer the first end (42) of the drum (40), and a processing zone outlet (82), nearer the second end (44) of the drum (40). In the preferred embodiment, the water inlet (78) communicates with the processing zone (68) at a location adjacent to the processing zone outlet (82). This preferred location of the water inlet (78) is intended to maximize the exposure of the oil sand to the water within the drum (40) by increasing the length or portion of the processing zone (68) which is exposed to the water as the water flows from the water inlet (78) towards the first end (42) of the drum (40).

Further, as discussed below, the water is heated prior to be conducted through the water inlet (78) and is at its highest temperature as it enters through the water inlet (78). Thus, as a result of the positioning of the water inlet (78), the oil sand first entering the drum (40) through the oil sand inlet (74) is contacted with the water at its lowest temperature just before the water exits through the liquid stream outlet (76). Conversely, the oil sand is contacted with the water at its highest temperature adjacent to the processing zone outlet (82), prior to removal of the solid stream (36). In effect, the bitumen that is most difficult to liberate is contacted with the highest temperature of water, thus facilitating its liberation.

Preferably, a sufficient amount of water is conducted through the water inlet (78) to ensure a gradient through the drum (40) towards the first end (42) of the drum (40). Thus, the liquid stream (34) will tend to flow towards the liquid stream outlet (76) at the first end (42). In the preferred embodiment, a sufficient water gradient is created so long as about 5-6 inches (about 12.7-15.24 cm) of water are provided above the solid particles contained therein.

Further, the water inlet (78) may be comprised of one or more of any suitable conduit, pipe or tubular member capable of conducting or conveying the water to the processing zone (68). However, preferably, the water inlet (78) is comprised of two water distribution lines. A first water distribution line (84) provides an amount of water recycled from the liquid stream (34) discharged from the liquid stream outlet (76). A second water distribution line (86) provides an additional amount of water supplied from a secondary water supply or reservoir.

As indicated previously, the liquid stream (34) may be further processed to provide an amount of water for recycling and/or to provide an amount of a sludge for return to the apparatus (32). In particular, the liquid stream (34) may be further processed for separation of the bitumen from a suspension of dispersed fine solid particles. For instance, one or more of a froth separator vessel (not shown), a froth flotation cell (not shown), a froth cleaner vessel (not shown) and a solids thicker (not shown), as described in Canadian Patent No. 2,123,076, may be used to perform this function. In essence, the bitumen is substantially removed from the suspension of dispersed fine solid particles. The suspension is then dewatered to remove an amount of water for recycling to the drum (40) via the first water distribution line (84) and to produce an amount of a sludge.

The sludge comprises a suspension of dispersed fine solid particles, typically dispersed fine mineral matter consisting of clays and silts. A small amount of coarse material may also be present in the sludge, as may be a small amount of bitumen not able to be separated from the solid particles during processing.

The amount of water available for recycling to the drum (40) via the first water distribution line (84) may not be sufficient to meet the needs of the apparatus (32) or the process performed therein. Thus, where required, an additional amount of water, referred to as makeup water, may be supplied from a secondary water supply or reservoir via the second water distribution line (86) in order to supply or meet the total water demand or requirements of the apparatus (32). The water supplied by each of the first and second water distribution lines (84, 86) is heated in a known or conventional manner prior to introduction into the drum (40) in order to facilitate or enhance the separation of the bitumen from the solid particles.

As well, the apparatus (32) is further comprised of a solid stream outlet (88) for the drum (40). Preferably, the solid stream outlet (88) is located at or adjacent the second end (44) of the drum (40) such that the compressing zone (66) is located between the processing zone (68) and the solid stream outlet (88). The solid stream outlet (88) is provided for discharging the solid stream (36) from the drum (40) or for conveying the solid stream (36) out of the drum (40) for further processing. In the preferred embodiment, as described further below, the solid stream (36) is subsequently vacuum filtered to remove any residual water from the solid particles.

Thus, the apparatus (32) provides for countercurrent separation of the oil sand. Specifically, the oil sand is introduced to the first end (42) of the drum (40) and transported through the drum (40) towards the second end (44) by the action of the spiral trough (70), where the solids stream is discharged through the solid stream outlet (88). Water is introduced through the water inlet (78) to the processing zone (68) adjacent the second end (44) of the drum (40) and flows in the direction of the first end (42), where the liquid stream (34) is discharged or expelled through the liquid stream outlet (76).

Each of the conditioning zone (64), the processing zone (68) and the compressing zone (66) perform a particular function as the oil sand is moved therethrough by the action of the spiral trough (70).

The conditioning zone (64) permits the oil sand to be introduced to and gently contacted by the water in order to commence the liberation or separation of the bitumen from the oil sand. Preferably, the conditioning zone (64) defines a conditioning zone inlet (90) and a conditioning outlet (92) adjacent the processing zone inlet (80). The oil sand inlet (74) preferably communicates with the conditioning zone inlet (90). Further, in the preferred embodiment, it has been found that at the conditioning zone inlet (90), the solid stream (36) in the drum (40) includes about 48% solid particles and about 52% water and bitumen.

The processing zone (68) agitates the oil sand within the spiral trough (70) and further contacts the oil sand with the water in order to enhance the extraction or liberation of the bitumen, while also expelling some of the water from the solid stream (36) moving towards the second end (44) of the drum (40). In the preferred embodiment, it has been found that at the processing zone inlet (80), the solid stream (36) in the drum (40) includes about 55% solid particles and about 45% water and bitumen. At the processing zone outlet (82), the solid stream (36) in the drum (40) includes about 53% solid particles and about 47% water and bitumen. The increased water content near the processing zone outlet (82) is largely a result of the positioning of the water inlet (78) therein.

The compressing zone (66) compresses the oil sand or solid stream (36) within the spiral trough (70) moving towards the second end (44) of the drum (40) to expel any excess or residual water prior to discharge through the solid stream outlet (88). Preferably, the compressing zone (66) defines a compressing zone inlet (94) adjacent the processing zone outlet (82) and a compressing zone outlet (96). In the preferred embodiment, it has been found that at the compressing zone inlet (94), the solid stream (36) in the drum (40) includes about 53% solid particles and about 47% water and bitumen. At the compressing zone outlet (96), the solid stream (36) in the drum (40) includes about 70% solid particles and about 30% water and bitumen.

Each of the conditioning, processing and compressing zones (64, 68, 66) is configured or adapted to perform its respective function. More particularly, the spiral trough (70) through each zone (64, 68, 66) has a width (98) or pitch and a height (100). In combination, the selection of the width (98) and the height (100) provide a transverse cross-sectional area of the spiral trough (70). In the preferred embodiment, the width (98), the height (100) and the resulting cross-sectional area of the spiral trough (70) in each of the conditioning, processing and compressing zones (64, 68, 66) is selected to facilitate or enhance the intended function of that respective zone (64, 68, 66).

With respect to the width (98) of the spiral trough (70), the width (98) or pitch generally decreases through each of the conditioning, processing and compressing zones (64, 68, 66) to expel or squeeze the water from the solid stream (36) in the direction of the second end (44) of the drum (40).

Thus, preferably, the width (98) of the spiral trough (70) through the compressing zone (66) is less than the width (98) of the spiral trough (70) through the processing zone (68). Further, the width (98) of the spiral trough (70) at the compressing zone outlet (96) is preferably less than the width (98) of the spiral trough (70) at the compressing zone inlet (94). Similarly, the width (98) of the spiral trough (70) through the processing zone (68) is less than the width of the spiral trough (70) through the conditioning zone (64).

Within the processing zone (68), the width (98) of the spiral trough (70) is selected, at least in part, to substantially retain the solid particles within the spiral trough (70) while accommodating the water entering the processing zone (68) adjacent the processing zone outlet (82) and maintaining the desired water gradient. Thus, the flow of any solid particles within the water towards the first end (42) of the drum (40) may be minimized. In the preferred embodiment, the processing zone (68) includes 8 revolutions of the spiral trough (70), each having a width (98) of about 0.748 meters.

Within the compressing zone (66), the width (98) of the spiral trough (70) is selected, at least in part, to compress the oil sand or solid stream (36) within the spiral trough (70) to expel the water from the solid particles. However, the width (98) is also selected with regard to the anticipated amount of solid particles to be contained or moved within the spiral trough (70) and the anticipated size of the solid particles such that the spiral trough (70) is able to accommodate the solid particles therein. Further, in the direction from the compressing zone inlet (94) towards the compressing zone outlet (96), the solid stream (36) is increasingly compressed or gradually further compressed by the spiral trough (70) to further expel the water. In the preferred embodiment, the compressing zone (66) includes 3 revolutions of the spiral trough (70), wherein the first revolution adjacent the compressing zone inlet (94) has a width (98) of about 0.526 meters and the remaining two revolutions of the spiral trough (70) have a width (98) of about 0.432 meters.

Within the conditioning zone (64), the width (98) of the spiral trough (70) is selected, at least in part, to accommodate the amount of oil sand entering the conditioning zone (64) such that the spiral trough (70) is able to substantially accommodate the oil sand therein while maintaining the desired water gradient. Further, the width (98) is selected to enhance the contact between the water and the oil sand. In the preferred embodiment, the conditioning zone (64) includes 3 revolutions of the spiral trough (70), each having a width (98) of about 0.943 meters.

With respect to the height (100) of the spiral trough (70), the height (100) generally increases through each of the conditioning, processing and compressing zones (64, 68, 66) to facilitate the desired water gradient through the drum (40) and to facilitate the flow of the liquid steam in the direction of the first end (42) of the drum (40).

Thus, preferably, the height (100) of the spiral trough (70) through at least a portion of the compressing zone (66) is greater than the height (100) of the spiral trough (70) through both the conditioning zone (64) and the processing zone (68). Further, the height (100) of the spiral trough (70) at the compressing zone outlet (96) is preferably greater than the height (100) of the spiral trough (70) at the compressing zone inlet (94).

Within the compressing zone (66), the height (100) of the spiral trough (70) is selected, at least in part, to facilitate the desired water gradient through the drum (40) and to inhibit or prevent the undesirable backflow of the liquid stream (34) towards the second end (44) of the drum (40). Further, the height (100) of the spiral trough (70) in the compressing zone (66) is also selected, in combination with the width (98), having regard to the anticipated amount of solid particles to be retained within the spiral trough (70) such that the spiral trough (70) is able to accommodate the solid particles therein.

Finally, the increased height of the spiral trough (70) from the compressing zone inlet (94) to the compressing zone outlet (96) further inhibits any undesirable backflow of the liquid stream (34). As well, due to the decreasing width (98) of the spiral trough (70), the height (100) of the spiral trough (70) is preferably increased in the direction of the compressing zone outlet (96) so that the solid stream (36) may be accommodated therein.

The preferred embodiment depicted in the Figures is a very small commercial scale apparatus (32) which is designed to be suitable for processing approximately 300 tonnes of oil sand per hour with a residence time in the drum (40) of approximately 10 minutes. It is contemplated that smaller or larger apparatus may be designed and constructed by appropriate scaling of the design of the depicted preferred embodiment. The dimensions of the preferred embodiment are therefore exemplary only.

In the preferred embodiment, the conditioning, processing and compressing zones (64, 68, 66) include a total of 14 revolutions of the spiral trough (70), numbered from the first end (42) in the direction of the second end (44) of the drum (40). The initial starting revolution (i.e. revolution no. 0) and revolutions no. 1 through no. 9 have a height (100) of about 1.6 meters. Thus, the height (100) of the spiral trough (70) through the conditioning zone (64) is 1.6 meters.

Revolutions no. 10 and no. 11 of the spiral trough (70) have a height (100) of about 1.7 meters and about 1.8 meters respectively. Thus, the height (100) of the spiral trough (70) at the processing zone inlet (80) is about 1.6 meters, which increases to about 1.8 meters at the processing zone outlet (82).

Revolution no. 12 and no. 13 of the spiral trough (70) have a height (100) of about 1.9 meters, while revolution no. 14 reduces from a height of about 1.9 meters to about 0.0762 meters. Thus, the height (100) of the spiral trough (70) at the compressing zone inlet (90) is about 1.8 meters, which increases towards the compressing zone outlet (92) to about 1.9 meters.

Finally, as discussed, the width (98) and the height (100) of the spiral trough (70) in each zone (64, 68, 66) are selected in combination, or having regard to the other, such that the zone (64, 68, 66) has a transverse cross-sectional area which is compatible with the intended function of that zone (64, 68, 66). In the preferred embodiment, the transverse cross-sectional area of the spiral trough (70) through the compressing zone (66) is less than the transverse cross-sectional area of the spiral trough (66) through the processing zone (68).

Further, the liquid stream outlet (76) also has a height (102). The height (102) of the liquid stream outlet (76) is selected, at least in part, to also facilitate the desired water gradient and the flow of the liquid stream (34) towards the liquid stream outlet (76). Thus, preferably, the height (100) of the spiral trough (70) through at least a portion of the compressing zone (66) is greater than the height (102) of the liquid stream outlet (76). In the preferred embodiment, the height (102) of the liquid stream outlet (76) is about 1.6 meters.

The lifting members (72) through the spiral trough (70) are also configured and spaced in each of the conditioning, processing and compressing zones (64, 68, 66) of the drum (40) to lift the oil sand as the spiral trough (70) rotates and to otherwise facilitate or assist each zone (64, 68, 66) in the performance of its respective intended function.

Figure 4:
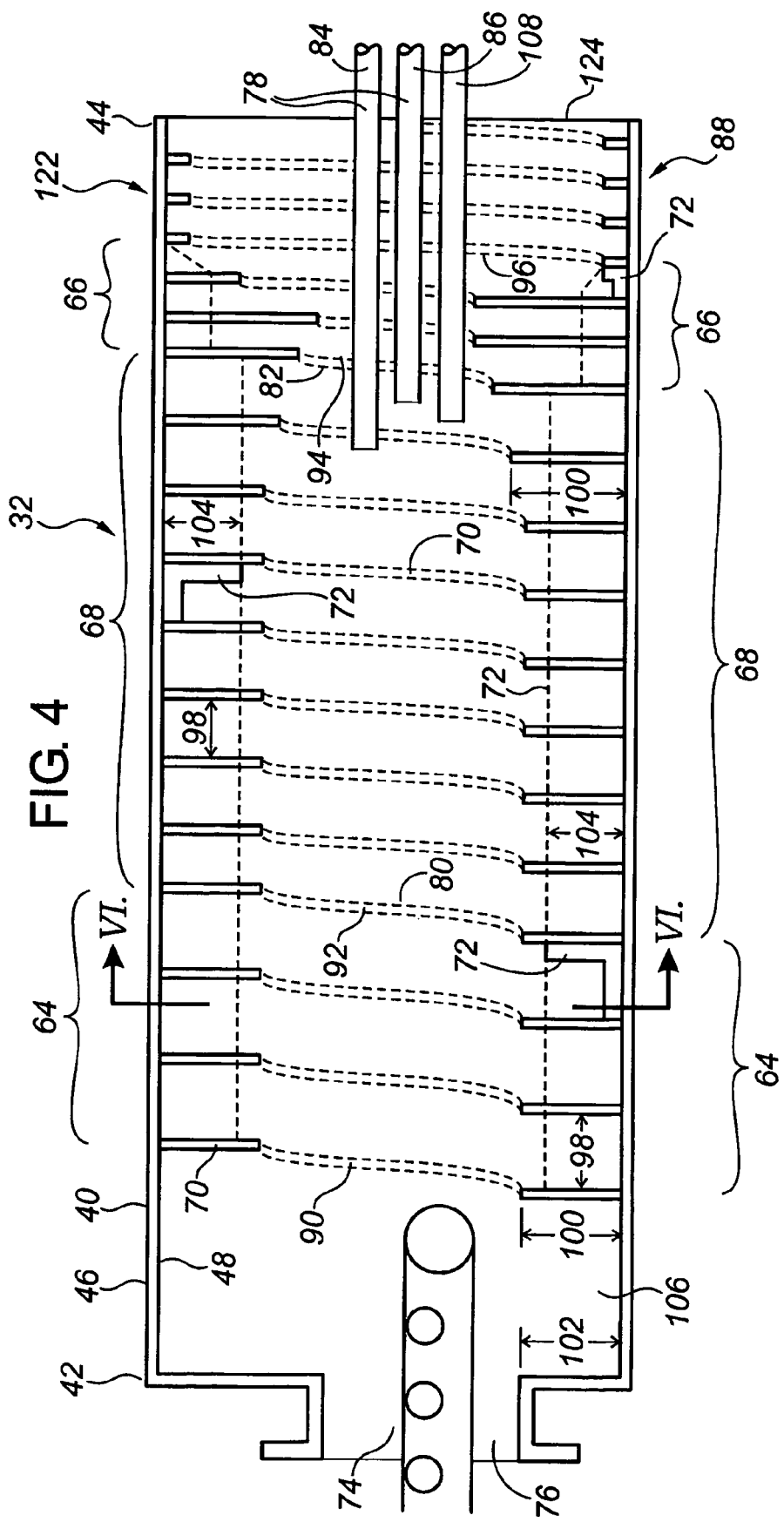
FIG. 4 is a longitudinal sectional view of the apparatus shown in FIG. 3.
Figure 5:
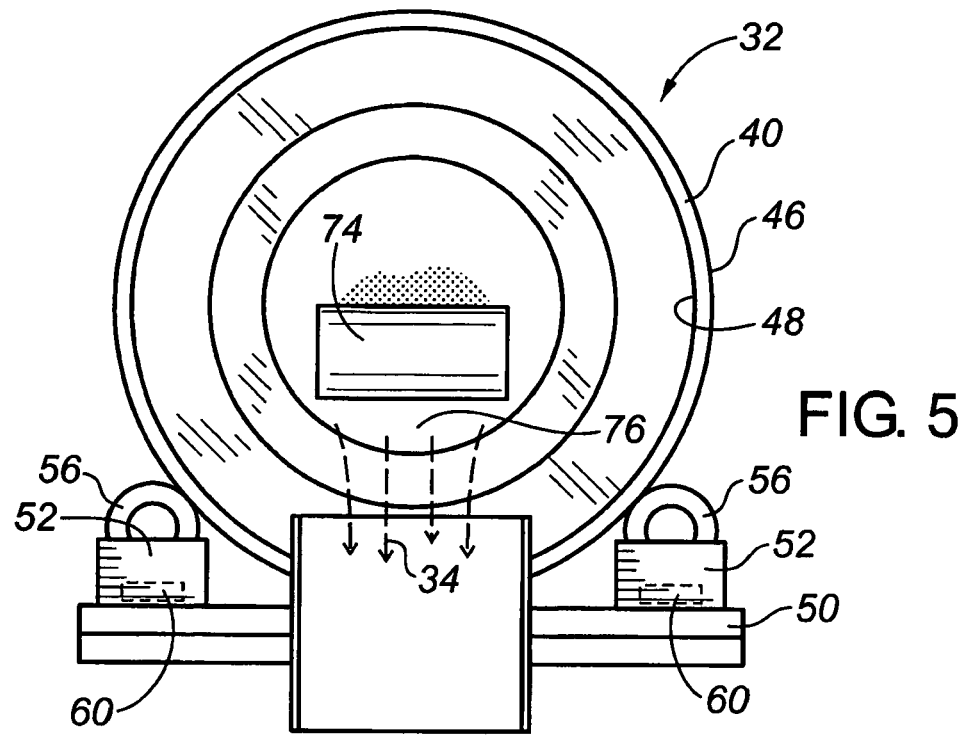
FIG. 5 is an end view of the apparatus shown in FIG. 3 from a first end.
Figure 6:
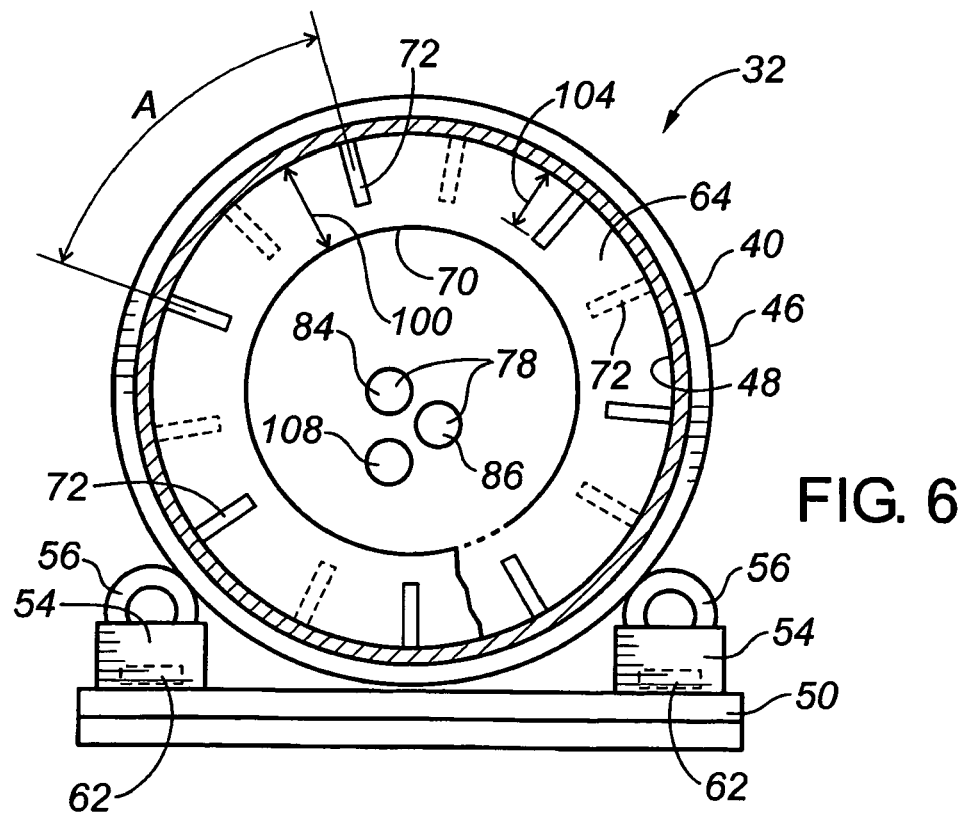
FIG. 6 is a cross-sectional view of the apparatus taken along lines VI-VI of FIG. 4.
Figure 7:
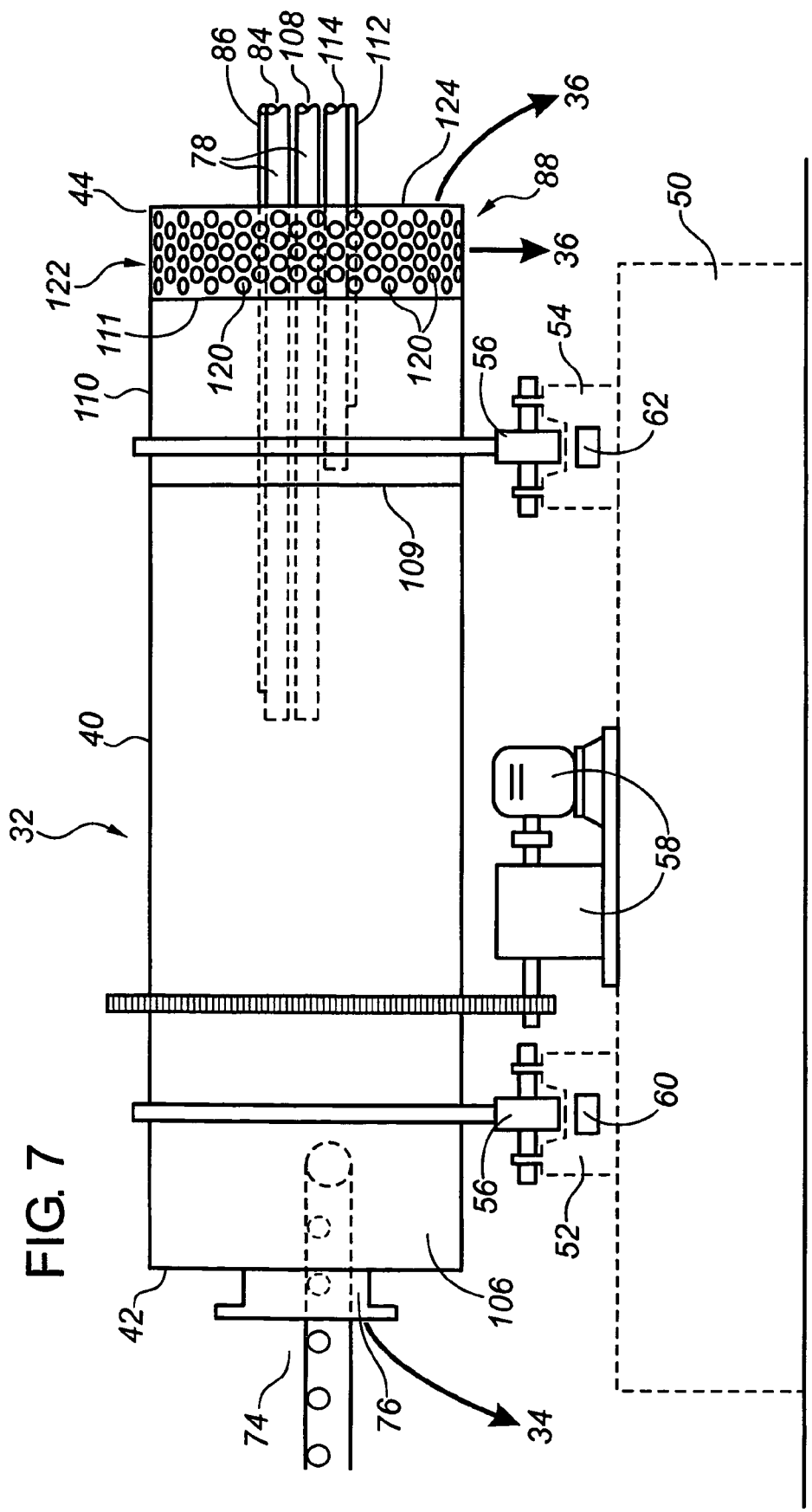
FIG. 7 is a side view of the apparatus shown in FIG. 3, further comprising a solid particle mixing section.

Thus, each lifting member (72) has a height (104) as shown by the dotted lines in FIGS. 4 and 8, wherein the height (104) may vary through each of the conditioning, processing and compressing zones (64, 68, 66) as necessary to facilitate or enhance the intended function of the respective zone (64, 68, 66) as discussed above.

Within the processing zone (68), the height (104) of the lifting members (72) is selected, at least in part, to contribute to the desired agitation of the oil sand within the spiral trough (70) and contact between the oil sand and the water in order to enhance the extraction or liberation of the bitumen. Within the compressing zone (66), the height (104) of the lifting members (72) is selected, at least in part, to move or convey the solid stream (36) in the direction of the second end (44) of the drum towards the solid stream outlet (88). Thus, less agitation of the oil sand is desirable within the compressing zone (66) as compared with the processing zone (68).

Thus, the height (104) of the lifting members (72) through the compressing zone (66) is preferably less than the height (104) of the lifting members (72) through the processing zone (68). In the preferred embodiment, the height (104) of the lifting members (72) in each of the conditioning zone (64) and the processing zone (68) is about 1.1 meters. The height (104) of the lifting members (72) in the compressing zone (66) is about 0.75 meters.

In addition, the drum (40) is preferably further comprised of a froth pooling section (106) as shown in FIGS. 4 and 8. The froth pooling section (106) is preferably positioned adjacent the first end (42) of the drum, between the first end (42) and the conditioning zone (64), and in communication with the liquid stream outlet (76). The froth pooling section (106) is provided for the settling of any solid particles in the liquid stream (34) to the bottom of the drum (40) prior to discharge of the liquid stream (34) through the liquid steam outlet (76). In other words, any solid particles that may be contained within, or that have been carried along by, the liquid stream (34) are provided with an opportunity to settle within the froth pooling section (106) in order to reduce or minimize the amount of solid particles within the liquid stream (34). In order to facilitate the settling of the solid particles, the spiral trough (70) does not extend through the froth pooling section (106).

The apparatus (32) may also be further comprised of a drum flocculant inlet (108) for introducing a flocculant to the oil sand within the drum (40). Preferably, the drum flocculant inlet (108) communicates with the processing zone (68) of the drum (40) so that the flocculant and the water may together be gently mixed with the oil sand within the conditioning zone (64). More preferably, the drum flocculant inlet (108) communicates with the processing zone (68) adjacent the water inlet (78) so that the flocculant may be mixed with the water before contacting the oil sand. The drum flocculant inlet (108) may also be combined with the water inlet (78) so that the drum flocculant inlet (108) is comprised of the water inlet (78). The flocculant aids or facilitates the aggregation and settlement of the fine mineral matter comprising the solid particles and may assist in increasing the recovery of bitumen from the oil sand. Thus, the oil sand from the oil sand inlet (74) may be contacted and mixed with both the water and the flocculant within the conditioning zone (64).

Figure 9:
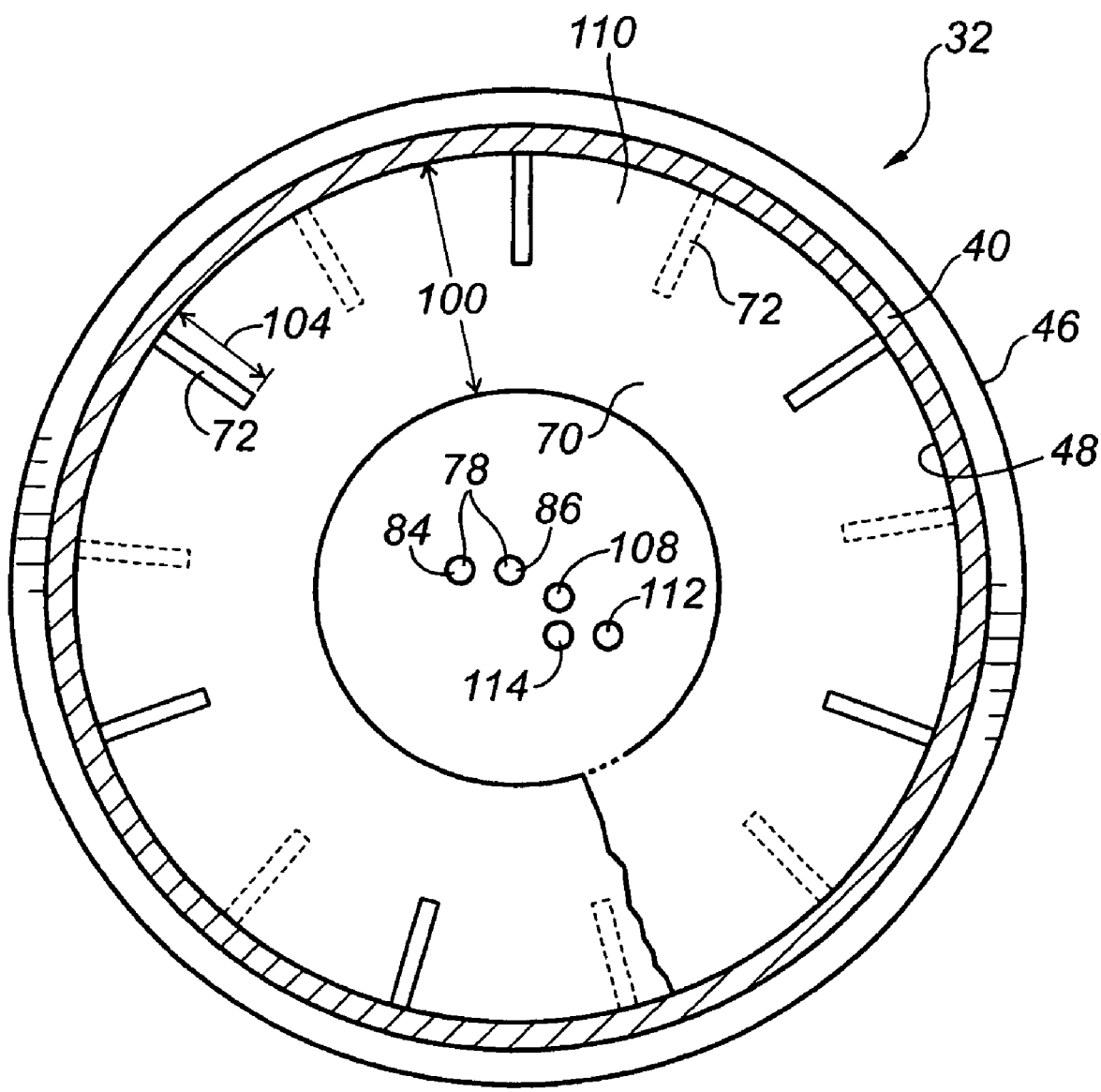
FIG. 9 is a cross-sectional view of the apparatus taken along lines IX-IX of FIG. 8.
Figure 10:
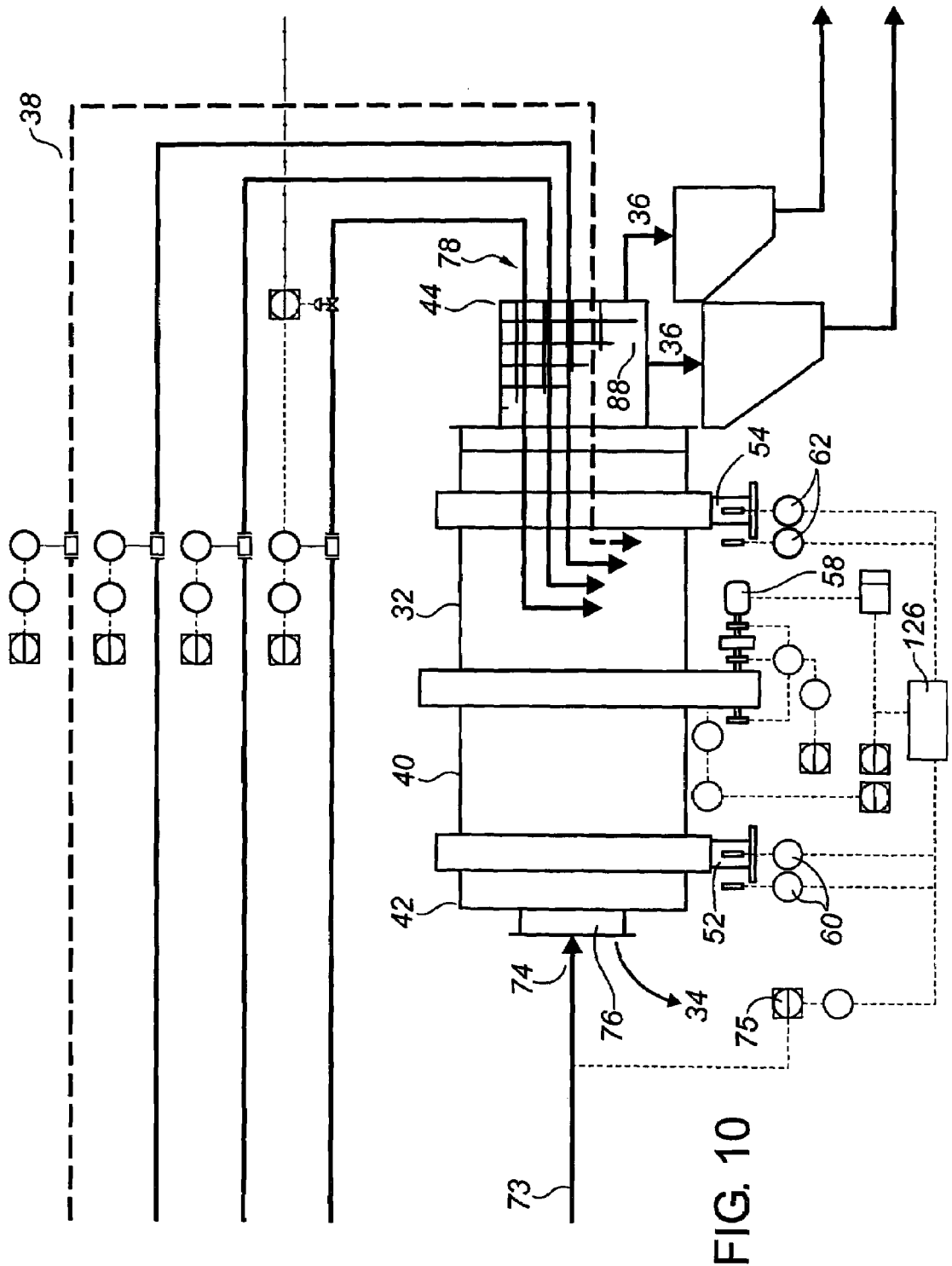
FIG. 10 is a schematic of a preferred embodiment of a control system of the invention for the apparatus shown in FIG. 3.

In addition, the apparatus (32) may include a solid particle mixing section (110). FIGS. 3-4 show the apparatus (32) without a solid particle mixing section (110), while FIGS. 8-9 show the apparatus (32) with a solid particle mixing section (110). Where the apparatus (32) does not include a solid particle mixing section (110), the solid stream (36) from the apparatus (32) is preferably directed to a separate mixer (not shown) for further processing. For instance, the solid stream (36) may be directed to a mixing drum as described and shown in FIGS. 1 and 4 of Canadian Patent No. 2,123,076.

Thus, referring to FIGS. 8-9, the solid particle mixing section (110) is provided for mixing the solid particles contained within the drum (40) with at least one additive. Preferably, the solid particle mixing section (110) is integral with the drum (40), such that the drum (40) is comprised of the solid particle mixing section (110), and is located between the compressing zone (66) and the second end (44) of the drum (40). Preferably, the solid particle mixing section (110) defines a mixing section inlet (109) and a mixing section outlet (111). Thus, the mixing section inlet (109) is adjacent the compressing zone outlet (96) and the mixing section outlet (111) is adjacent the solid stream outlet (88). The solid particle mixing section (110) is positioned downstream of the compressing zone (66) so that a significant or substantial amount of the water may be discharged or expelled from the solid particles prior to further mixing of the solid particles with the desired additive or additives.

Preferably, two additives are mixed with the solid stream (36) within the solid particles mixing section (110), being a flocculant and a sludge. Any suitable flocculant may be used for further facilitating or promoting the aggregation of any fine mineral matter or fine solid particles comprising the solid stream (36). The sludge may be provided from any source. However, as described previously, the liquid stream (34) exiting the liquid stream outlet (76) may be further processed to produce the sludge, which is then recycled back to the solid particle mixing section (110).

Preferably, each of the additives is introduced or communicated to the solid particle mixing section (110) by a separate inlet, however, the additives may be introduced concurrently by a single inlet. In the preferred embodiment, the apparatus (32) is further comprised of a mixing section sludge inlet (112) for introducing the sludge and a mixing section flocculant inlet (114) for introducing the flocculent. Each of the inlets (112, 114) may be comprised of any suitable conduit, pipe or tubular member capable of conducting or conveying the sludge or flocculant respectively to the solid particle mixing section (110).

Further, the solid particle mixing section (110) preferably includes a sludge inlet zone (116) and a flocculant inlet zone (118). In the preferred embodiment, the flocculant inlet zone (118) is positioned adjacent the compressing zone outlet (96) and the sludge inlet zone (116) is located between the flocculant inlet zone (118) and the second end (44) of the drum (40). The mixing section sludge inlet (112) extends through the second end (44) of the drum (40) for communication with the sludge inlet zone (116), while the mixing section flocculant inlet (114) extends through the second end (44) of the drum (40) for communication with the flocculant inlet zone (118). Thus, the flocculant is introduced to, and mixed with, the solid particles prior to introducing and mixing the sludge with the solid particles. This order of introduction is preferred as it is believed that the flocculant coats the solid particles, which then acts as a nucleus for the flocculation of the dispersed fine materials contained within the sludge.

Preferably, the spiral trough (70) extends through the solid particle mixing section (110) to impart a spiral rolling motion to the solid particles within the solid particle mixing section (110) and thereby facilitate or enhance the mixing of the flocculant and the sludge with the solid particles. In the preferred embodiment, the length of the drum (40) is extended and the drum (40) comprises the solid particle mixing section (110). Thus, as in the remainder of the drum (40), the spiral trough (70) is fixed to the interior surface (48) of the drum (40) within the solid particle mixing section (110) so that rotation of the drum (40) rotates the spiral trough (70) within the solid particle mixing section (110).

Preferably, the spiral trough (70) extends through the solid particle mixing section (110) for about 2 revolutions to facilitate mixing of the solid particles and the flocculant and about 2 revolutions to facilitate mixing of the solid particles and flocculant with the sludge. In the preferred embodiment, the solid particle mixing section (110) therefore includes about four revolutions of the spiral trough (70). However, the number of revolutions, as well the width (98), the height (100) and the resulting transverse cross-sectional area of the spiral trough (70) through the solid particle mixing section (110) are selected to facilitate or enhance its intended function.

Within the solid particle mixing section (110), the width (98) of the spiral trough (70) is selected, at least in part, to accommodate the size and amount of the solid particles entering the solid particle mixing section (110) from the compressing zone (66), as well as the amounts of the flocculant and the sludge being introduced therein. Thus, the width (98) of the spiral trough (70) through the solid particle mixing section (110) is preferably greater than the width (98) of the spiral trough (70) through the compressing zone (66). In the preferred embodiment, the width (98) of the spiral trough (70) through the solid particle mixing section (110) is about 0.6 meters for the first two revolutions and about 0.75 meters for the remaining two revolutions.

In addition, the height of the spiral trough (70) within the solid particle mixing section (110) is selected, at least in part, to further inhibit or prevent the backflow of the liquid stream (34) from the processing zone (68) towards the solid particle mixing section (110) and also to inhibit or prevent backflow from the solid particle mixing section (110) to the compressing section (66). Additionally, as with the width (98), the height (100) is selected having regard to the anticipated amount of solid particles, flocculant and sludge to be conveyed through and mixed within the spiral trough (70). Preferably, the height (100) of the spiral trough (70) through the solid particle mixing section (110) is about the same as the maximum height (100) of the spiral trough (70) through the compressing zone (66). Thus, in the preferred embodiment, the height of the spiral trough (70) through the solid particle mixing section (110) is about 1.9 meters.

As well, the lifting members (72), as described previously, are preferably continued along the spiral trough (72) through the solid particle mixing section (110). The lifting members (72) are configured, sized and spaced in the solid particle mixing section (110) to lift the solid particles as the spiral trough (70) rotates and to facilitate or enhance the intended function of the solid particle mixing section (110).

In the preferred embodiment, the lifting members (72) are distributed about every 55 degrees about the circumference of the interior surface (48) of the drum (40) through the solid particle mixing section (110). Further, the height (104) of the lifting members (72), shown by the dotted line in FIG. 8, through the solid particle mixing section (110) is preferably greater than the height (104) of the lifting members (72) through the compressing zone (66) in order to enhance the mixing through the solid particle mixing section (110). Thus, in the preferred embodiment, the height (104) of the lifting members (72) in the solid particle mixing section (110) is preferably greater than about 0.75 meters and preferably between about 0.75 meters and about 1.1 meters.

Finally, the solid stream outlet (88) may be comprised of any suitable conduit, pipe or discharge device or conveyor capable of discharging or expelling the solid stream (36) from the second end (44) of the drum (40). However, the solid stream outlet (88) is preferably as shown in FIGS. 3-4 and 7-8, wherein the solid particles comprising the solid stream (36) are sorted or separated according to the size of the solid particle prior to being discharged.

Preferably, the solid stream outlet (88) is comprised of the drum (40) defining a plurality of perforations (120) at or adjacent the second end (44) of the drum (40) which provide a screen section (122) of the drum (40). More particularly, where the apparatus (32) does not include the solid particle mixing section (110), as shown in FIGS. 3-4, the screen section (122) is positioned adjacent the compressing zone outlet (96). Where the apparatus (32) includes the solid particle mixing section (110), as shown in FIGS. 8-9, the screen section (122) is positioned adjacent the mixing section outlet (111). The perforations (120) of the screen section (122) are sized so that solid particles having a size less than or equal to a desired maximum size may exit the drum (40) through the perforations (120). In the preferred embodiment, the desired maximum size is about 75 millimeters, which for most applications will facilitate pumping of the solid particles as a slurry after they have exited the drum (40).

In addition, the solid stream outlet (88) is preferably further comprised of an oversized particle outlet (124) located at and defining the second end (44) of the drum (40). Accordingly, solid particles having a size greater than the desired maximum size are conveyed through the screen section (122) for discharge from the drum (40) through the oversized particle outlet (124). The oversized particle outlet (124) is preferably comprised of the second end (44) of the drum (40) defining an opening or conduit therein for passage of the oversized particles. The oversized particles may be recombined with other solid particles or may be directed to another location for disposal.

The drum (40) including the conditioning, processing and compressing zones (64, 68, 66), the screen section (122) and the solid particle mixing section (110) may have any relative dimensions so long as each is capable of performing its intended function. However, in the preferred embodiment, the drum (40) including the conditioning, processing and compressing zones (64, 68, 66) has a length, measured along the longitudinal axis of the drum (40), of about 25 meters. The screen section (122) has a length of about 2.5 meters. Finally, the solid particle mixing section (110) has a length of about 5 meters or twice long as the screen section (122).

Further, it has been found that the residence time of the oil sand within the drum (40) is not particularly critical to the recovery of bitumen within the liquid stream (34). Thus, where desired, the length of the drum (40) between the first and second ends (42, 44) may be reduced while maintaining the same number of revolutions of the spiral trough (70)

within the drum (40). In the preferred embodiment, the residence time within the drum (40) is preferably between about 7 to 20 minutes.

Preferably, the spiral trough (70), as described previously, extends through the screen section (122) to the oversized particle outlet (124) to impart a spiral rolling motion to the solid particles within the screen section (122). In the preferred embodiment, as in the remainder of the drum (40), the spiral trough (70) is fixed to the interior surface (48) of the drum (40) within the screen section (122) so that rotation of the drum (40) rotates the spiral trough (70) within the screen section (122).

The spiral rolling motion of the solid particles by the spiral trough (70) facilitates and enhances the sorting and exiting through the perforations (120) of those solid particles having a size less than or equal to the desired maximum size. Further, the action of the spiral trough (70) also facilitates the exiting or discharge of the solid particles having a size greater than the desired maximum size through the oversized particle outlet (124). However, in order to further facilitate the sorting of the particles sizes and exiting through either the screen section (122) or the oversized particle outlet (124), the lifting members (72) are not provided in the screen section (122).

The number of revolutions, as well the width (98), the height (100) and the resulting transverse cross-sectional area of the spiral trough (70) through the screen section (122) are selected to facilitate or enhance its intended function. Thus, within the screen section (122), the width (98) and the height (100) of the spiral trough (70) are selected, at least in part, to be capable of conveying the solid particles therethrough, while permitting the different sized particles to exit from either the perforations (120) of the screen section (122) or the oversized particle outlet (124).

Where there is no solid particle mixing section (110), as in FIGS. 3-4, the width (98) of the spiral trough (70) through the screen section (122) is preferably about the same as the width (98) of the spiral trough (70) through at least a portion of the compressing zone (66). The height (100) of the spiral trough (70) through the screen section (122) is preferably less than the height (100) of the spiral trough (70) through the compressing zone (66) in order to facilitate the movement of the solid particles through the screen section (122).

Where there is a solid particle mixing section (110), as in FIGS. 8-9, the width (98) of the spiral trough (70) through the screen section (122) is less than the width (98) of the spiral trough (70) through the solid particle mixing section (110). The height (100) of the spiral trough (70) through the screen section (122) is preferably less than the height (100) of the spiral trough (70) through the solid particle mixing section (110) to again facilitate the movement of the solid particles through the screen section (122).

In the preferred embodiment, either with or without the solid particle mixing section (110), the spiral trough (70) extends through the screen section (122) for about three revolutions of the drum (40). The width (98) of the spiral trough (70) through the screen section (122) is about 0.5 meters. Further, the height (100) of the spiral trough (70) through the screen section (122) is about 0.0762 meters.

Where the apparatus (32) includes a solid particle mixing section (110), the solid stream (36) exiting through the solid stream outlet (88) is preferably conveyed or discharged to a vacuum filter (not shown). Although any conventional vacuum filter may be used, the vacuum filter is preferably a vacuum belt filter as described in Canadian Patent No. 2,123,076. In particular, the vacuum belt filter is comprised of a perforated belt which is covered by a filter media. The solid stream (36), being a mixture of solid particles, flocculant and sludge, is deposited on the covered belt and a vacuum is drawn from underneath to remove water or moisture from the mixture. The dewatered mixture is then transported for storage or disposal.

The subsequent dewatering of the solid stream (36) by the vacuum belt filter may be facilitated or enhanced by the separation of the solid particles according to size by the screen section (122) and the oversized particle outlet (124). In particular, the vacuum may work more efficiently where the larger solid particles are deposited on top of the smaller solid particles on the vacuum belt filter. Thus, the screen section (122) separates those solid particles having a size less than or equal to the desired maximum size. As these smaller solid particles exit through the perforations (120), the particles are preferably deposited upon the vacuum belt filter. The solid particles having a size greater than the desired maximum size are subsequently discharged through the oversized particle outlet (124). These larger solid particles may be deposited upon the vacuum filter in a layer on top of or overlying the smaller solid particles so that the smaller solid particles protect the vacuum filter surface from damage which might otherwise be caused by the larger solid particles directly contacting the vacuum filter surface. Alternatively, the larger solid particles may be directed to a different location for disposal.

As discussed, the invention also relates to the control system (38) for the apparatus (32) and a method for controlling the apparatus (32). The control system (38) is comprised of the first drum load sensor (60), the second drum load sensor (62), the oil sand feedrate sensor (75) and a controller (126). The controller (126) is operatively connected with the first drum load sensor (60), the second drum load sensor (62), the oil sand feedrate sensor (75), the drive mechanism (58) and the oil sand feed mechanism (73). Thus, the controller (126) may control or adjust the rotation speed of the drum (40) and the feedrate of the oil sand feed mechanism (73) in response to input data from the first drum load sensor (60), the second drum load sensor (62) and the oil sand feedrate sensor (75). The preferred embodiment of the controlling method is performed utilizing the control system (38) described herein.

The method for controlling the apparatus (32) is comprised of the step of sensing the first drum load. Preferably, the first drum load sensing step is performed using the first drum load sensor (60). The sensed data relating to the first drum load is then communicated to the controller (126).

The method is further comprised of the step of sensing the second drum load. Preferably, the second drum load sensing step is performed using the second drum load sensor (62). The sensed data relating to the second drum load is also communicated to the controller (126).

In addition, the method is comprised of the step of sensing the feedrate of the oil sand feed mechanism (73). Preferably, the feedrate sensing step is performed using the oil sand feedrate sensor (75) associated with the oil sand feed mechanism (73). The sensed data is further communicated to the controller (126).

Finally, the method is comprised of the step of controlling the rotation speed of the drum (40) and the feedrate of the oil sand feed mechanism (73). Preferably, the controlling step is performed using the controller (126). The controlling step is performed to adjust the rotation speed and feedrate in response to the sensed data from each of the sensing steps. Thus, the sensed data from the first drum load sensor (60), the second drum load sensor (62) and the oil sand feedrate sensor (75) is correlated and any necessary adjustments are made to the rotation speed and feedrate in order to maintain or achieve desired properties of both the solid stream (36) and the liquid stream (34).

More particularly, a minimum design density is determined for the solid stream (36) at the solid stream outlet (88). Further, a correlating maximum design concentration is preferably determined for the solid particles in the liquid stream (34). Based upon the sensed data provide to the controller (126), one or both of the rotation speed of the drum (40) and the feedrate of the oil sand feed mechanism (73) may be increased or decreased in order that the density of the solid stream (36) at the solid stream outlet (88) is maintained at or above the minimum design density and in order that the concentration of the solid particles in the liquid stream (34) is maintained at or below the maximum design concentration.

Thus, the drum rotation speed and the feed rate are adjusted in order to maintain a desired balance between the density of the solid stream (36) and the concentration of the solid particles in the liquid stream (34). In this regard, it has been found that an increase in the density of the solid stream (36) greater than a desired maximum density will result in an undesirable increase in the concentration of the solid particles in the liquid stream (34).

Further, in order to maximize the efficiency of the apparatus (32), the feedrate of the oil sand feed mechanism (73) is preferably maximized while still achieving the design density and concentration of the solid and liquid streams respectively. In particular, it has been found that the greater the oil sand feedrate, the higher the solids loading within the drum (40). The higher the solids loading in the drum (40), the greater the bitumen recovery in the liquid stream (34). Further, it has been found that the residence time of the oil sand within the drum (40) is not particularly critical to the recovery of bitumen within the liquid stream (34).

In addition, the rotation speed of the drum (40) must be maintained at a speed which permits the drum (40) to convey the oil sand through the drum (40) in a desired manner for processing without any significant back-up of the oil sand at the oil sand inlet (74) and in order that the solid stream (36) within the drum (40) is substantially contained within the spiral trough (70) of each of the conditioning, processing and compressing zones (64, 68, 66).

For instance, it is desirable that the apparatus (32) be controlled such that the oil sand which passes through the processing zone (68) is substantially contained in the spiral trough (70) below the height (100) of the spiral trough (70) in order to enhance the processing of the oil sand within the processing zone (68) and to minimize the backflow of solid particles towards the first end (42) of the drum (40).

Similarly, it is desirable that the apparatus (32) be controlled such that the oil sand or solid stream (36) which passes through the compressing zone (66) is also substantially contained in the spiral trough (70) below the height (100) of the spiral trough (72) in order to enhance the compressing or dewatering of the solid stream (36) to expel any water therefrom and to minimize the backflow of solid particles towards the first end (42) of the drum (40).

Further, it has been found that the feed rate of the oil sand and the rotation speed of the drum (40) tend to be related proportionately. In other words, if the feedrate of the oil sand feed mechanism (73) is increased, the drum rotational speed is typically increased proportionately in order to achieve the desired properties of the solid and liquid streams and to permit the apparatus (32) to process the oil sand without any significant back-up of the oil sand in the drum (40).

However, as indicated, as the drum speed increases, the density of the solid stream (36) at the solid stream outlet (88) will tend to decrease. Conversely, as the drum speed decreases, the density of the solid stream (36) at the solid stream outlet (88) will tend to increase. Thus, although it is desirable to maximize the feedrate of the oil sand feed mechanism (73), a balance is required to be achieved between the feedrate of the oil sand feed mechanism (73) and the rotation speed of the drum (40) in order to achieve the desired density of the solid stream (36).

In operation, the oil sand feedrate sensor (75) and the feedrate sensing step provide data relating to the actual feedrate of the oil sand feed mechanism (73). The first drum load sensor (60) and the first drum load sensing step provide data relating to the first drum load exerted on the first drum support (52). The second drum load sensor (62) and the second drum load sensing step provide data relating to the second drum load exerted on the second drum support (54).

The controlling step and the controller (126) adjust the rotation of the speed of the drum (40) and the feedrate of the oil sand feed mechanism (73) in order to maintain a desired or optimum weight distribution between the first drum support (52) and the second drum support (54). Thus, the drum rotation speed and the oil sand feedrate are adjusted in response to a change in the first drum load and the second drum load.

In this regard, an increase in the first drum load sensed by the first drum load sensor (60) is typically indicative of a back-up of the oil sand within the drum (40). Accordingly, the rotation speed of the drum (40) and/or the feedrate of the oil sand feed mechanism (73) may need to be adjusted to obtain a desired movement or flow of the oil sand and the solid stream (36) within the drum (40). In particular, the rotation speed of the drum (40) may be increased and/or the feedrate of the oil sand feed mechanism (73) may be decreased.

A decrease in the second drum load sensed by the second drum load sensor (62) is typically indicative of a decrease in the density of the solid stream (36) at the solid stream outlet (88) below the desired or optimum density. Accordingly, the rotation speed of the drum (40) and/or the feedrate of the oil sand feed mechanism (73) may need to be adjusted to increase the solid stream density. In particular, the rotation speed of the drum (40) may be decreased and/or the feedrate of the oil sand feed mechanism (73) may be increased.

In practice, the desired or optimum density of the solid stream (36) at the solid stream outlet (88) is predetermined and utilized as a "set point" during the operation of the apparatus (32). The "set point" is predetermined taking into account the desired minimum density of the solid stream (36) and the desired maximum concentration of the solid particles in the liquid stream (34). Further, the desired feedrate of the oil sand feed mechanism (73) is also selected or predetermined taking into account the density set point.

At the commencement of the operation, the rotation speed of the drum (40) is gradually increased to achieve the set point density of the solid stream (36) at the solid stream outlet (88). Subsequently, during operation of the apparatus (32), the rotation speed of the drum (40) may be adjusted as required in response to a change in one or both of the first and second drum loads in order to maintain the density of the solid stream (36) at the solid stream outlet (88) at the set point.

Finally, in this document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The embodiments of the invention in which an exclusive property or privilege is claimed are defined as follows:

1. An apparatus for processing oil sand to produce a liquid stream comprising water and bitumen and a solid stream comprising solid particles, the apparatus comprising:

(a) a generally cylindrical drum having a first end, a second end and an interior surface, the drum comprising a conditioning zone adjacent to the first end, a compressing zone adjacent to the second end, and a processing zone between the conditioning zone and the compressing zone;

(b) a rotatable spiral trough extending along the interior surface of the drum through the conditioning zone, the processing zone and the compressing zone, for imparting a spiral rolling motion to the oil sand, the spiral trough having a width, wherein the width of the spiral trough through the compressing zone is less than the width of the spiral trough through the processing zone;

(c) a plurality of lifting members oriented generally transversely within and spaced along the spiral trough, for lifting the oil sand as the spiral trough rotates;

(d) an oil sand inlet, wherein the oil sand inlet communicates with the conditioning zone of the drum;

(e) a liquid stream outlet for the drum located at the first end of the drum;

(f) a water inlet, wherein the water inlet communicates with the processing zone of the drum;

(g) a solid stream outlet for the drum located adjacent to the second end of the drum such that the compressing zone is located between the processing zone and the solid stream outlet; and (h) a drive mechanism for rotating the spiral trough.

2. The apparatus as claimed in claim 1 wherein the spiral trough is fixed to the drum so that rotation of the drum rotates the spiral trough and wherein the drive mechanism rotates the drum.

3. The apparatus as claimed in claim 1 wherein the width of the spiral trough through the processing zone is less than the width of the spiral trough through the conditioning zone.

4. The apparatus as claimed in claim 1 wherein the spiral trough through the processing zone defines a processing zone inlet and a processing zone outlet and wherein the water inlet communicates with the processing zone at a location adjacent to the processing zone outlet.

5. The apparatus as claimed in claim 1 wherein the spiral trough through the compressing zone defines a compressing zone inlet and a compressing zone outlet and wherein the width of the spiral trough at the compressing zone outlet is less than the width of the spiral trough at the compressing zone inlet.

6. The apparatus as claimed in claim 1 wherein the drum is further comprised of a froth pooling section located between the first end of the drum and the conditioning zone of the drum.

7. The apparatus as claimed in claim 6 wherein the spiral trough does not extend through the froth pooling section.

8. The apparatus as claimed in claim 1 wherein the spiral trough extends along the interior surface of the drum for between about five and about twenty revolutions of the drum.

9. The apparatus as claimed in claim 1 wherein the spiral trough has a transverse cross-sectional area and wherein the transverse cross-sectional area of the spiral trough through the compressing zone is less than the transverse cross-sectional area of the spiral trough through the processing zone.

10. The apparatus as claimed in claim 1 wherein the lifting members have a height and wherein the height of the lifting members through the compressing zone is less than the height of the lifting members through the processing zone.

11. The apparatus as claimed in claim 1 wherein the drum is further comprised of a solid particle mixing section for mixing the solid particles contained within the drum with at least one additive, wherein the solid particle mixing section is located between the compressing zone and the second end of the drum.

12. The apparatus as claimed in claim 11 wherein the solid particle mixing section is comprised of a sludge inlet zone and a flocculant inlet zone, further comprising a mixing section sludge inlet communicating with the sludge inlet zone and a mixing section flocculant inlet communicating with the flocculant inlet zone.

13. The apparatus as claimed in claim 12 wherein the sludge inlet zone is located between the flocculant inlet zone and the second end of the drum.

14. The apparatus as claimed in claim 11 wherein the spiral trough extends through the solid particle mixing section.

15. The apparatus as claimed in claim 14 wherein the width of the spiral trough through the solid particle mixing section is greater than the width of the spiral trough through the compressing zone of the drum.

16. The apparatus as claimed in claim 1, further comprising a drum flocculant inlet communicating with the drum.

17. The apparatus as claimed in claim 16 wherein the drum flocculant inlet communicates with the conditioning zone of the drum.

18. The apparatus as claimed in claim 1 wherein the solid stream outlet is comprised of the drum defining a plurality of perforations in the drum which provide a screen section of the drum, and wherein the perforations are sized so that the solid particles having a size less than or equal to a desired maximum size may exit the drum through the perforations.

19. The apparatus as claimed in claim 18 wherein the solid stream outlet is further comprised of an oversized particle outlet located at the second end of the drum whereby the solid particles having a size greater than the desired maximum size may exit the drum through the oversized particle outlet.

20. The apparatus as claimed in claim 19 wherein the spiral trough extends through the screen section of the drum.

21. The apparatus as claimed in claim 20 wherein the lifting members are not provided in the screen section of the drum.

22. The apparatus as claimed in claim 19 wherein the drum is further comprised of a solid particle mixing section for mixing the solid particles contained within the drum with at least one additive, wherein the solid particle mixing section is located between the compressing zone and the screen section of the drum.

23. The apparatus as claimed in claim 22 wherein the solid particle mixing section is comprised of a sludge inlet zone and a flocculant inlet zone, further comprising a mixing section sludge inlet communicating with the sludge inlet zone and a mixing section flocculant inlet communicating with the flocculant inlet zone.

24. The apparatus as claimed in claim 23 wherein the sludge inlet zone is located between the flocculant inlet zone and the screen section of the drum.

25. The apparatus as claimed in claim 22 wherein the spiral trough extends through the solid particle mixing section.

26. The apparatus as claimed in claim 25 wherein the width of the spiral trough through the solid particle mixing section is greater than the width of the spiral trough through the compressing zone of the drum.

27. The apparatus as claimed in claim 1 wherein the spiral trough has a height and wherein the height of the spiral trough through at least a portion of the compressing zone is greater than the height of the spiral trough through both the conditioning zone and the processing zone.

28. The apparatus as claimed in claim 27 wherein the liquid stream outlet has a height and wherein the height of the spiral trough through at least a portion of the compressing zone is greater than the height of the liquid stream outlet.

29. The apparatus as claimed in claim 28 wherein the spiral trough through the compressing zone defines a compressing zone inlet and a compressing zone outlet and wherein the height of the spiral trough at the compressing zone outlet is greater than the height of the spiral trough at the compressing zone inlet.

30. The apparatus as claimed in claim 28 wherein the spiral trough has a transverse cross-sectional area and wherein the transverse cross-sectional area of the spiral trough through the compressing zone is less than the transverse cross-sectional area of the spiral trough through the processing zone.

31. The apparatus as claimed in claim 28 wherein the solid stream outlet is comprised of the drum defining a plurality of perforations in the drum which provide a screen section of the drum, and wherein the perforations are sized so that the solid particles having a size less than or equal to a desired maximum size may exit the drum through the perforations.

32. The apparatus as claimed in claim 31 wherein the solid stream outlet is further comprised of an oversized particle outlet located at the second end of the drum whereby the solid particles having a size greater than the desired maximum size may exit the drum through the oversized particle outlet.

33. The apparatus as claimed in claim 32 wherein the spiral trough extends through the screen section of the drum.

34. The apparatus as claimed in claim 33 wherein the lifting members are not provided in the screen section of the drum.

35. The apparatus as claimed in claim 32 wherein the drum is further comprised of a solid particle mixing section for mixing the solid particles contained within the drum with at least one additive, wherein the solid particle mixing section is located between the compressing zone and the screen section of the drum.

36. The apparatus as claimed in claim 35 wherein the solid particle mixing section is comprised of a sludge inlet zone and a flocculant inlet zone, further comprising a mixing section sludge inlet communicating with the sludge inlet zone and a mixing section flocculant inlet communicating with the flocculant inlet zone.

37. The apparatus as claimed in claim 36 wherein the sludge inlet zone is located between the flocculant inlet zone and the screen section of the drum.

38. The apparatus as claimed in claim 35 wherein the spiral trough extends through the solid particle mixing section.

39. The apparatus as claimed in claim 38 wherein the width of the spiral trough through the solid particle mixing section is greater than the width of the spiral trough through the compressing zone of the drum.

40. An apparatus for processing oil sand to produce a liquid stream comprising water and bitumen and a solid stream comprising solid particles, the apparatus comprising:
   (a) a generally cylindrical drum having a first end, a second end and an interior surface, the drum comprising a conditioning zone adjacent to the first end, a compressing zone adjacent to the second end, and a processing zone between the conditioning zone and the compressing zone;
   (b) a rotatable spiral trough extending along the interior surface of the drum through the conditioning zone, the processing zone and the compressing zone, for imparting a spiral rolling motion to the oil sand, the spiral trough having a height, wherein the height of the spiral trough through at least a portion of the compressing zone is greater than the height of the spiral trough through both the processing zone and the conditioning zone;
   (c) a plurality of lifting members oriented generally transversely within and spaced along the spiral trough, for lifting the oil sand as the spiral trough rotates;
   (d) an oil sand inlet, wherein the oil sand inlet communicates with the conditioning zone of the drum;
   (e) a liquid stream outlet for the drum located at the first end of the drum;
   (f) a water inlet, wherein the water inlet communicates with the processing zone of the drum;
   (g) a solid stream outlet for the drum located adjacent to the second end of the drum such that the compressing zone is located between the processing zone and the solid stream outlet; and
   (h) a drive mechanism for rotating the spiral trough.

41. The apparatus as claimed in claim 40 wherein the spiral trough is fixed to the drum so that rotation of the drum rotates the spiral trough and wherein the drive mechanism rotates the drum.

42. The apparatus as claimed in claim 40 wherein the liquid stream outlet has a height and wherein the height of the spiral trough through at least a portion of the compressing zone is greater than the height of the liquid stream outlet.

43. The apparatus as claimed in claim 42 wherein the spiral trough through the compressing zone defines a compressing zone inlet and a compressing zone outlet and wherein the height of the spiral trough at the compressing zone outlet is greater than the height of the spiral trough at the compressing zone inlet.

44. The apparatus as claimed in claim 42 wherein the spiral trough has a transverse cross-sectional area and wherein the transverse cross-sectional area of the spiral trough through the compressing zone is less than the transverse cross-sectional area of the spiral trough through the processing zone.

45. The apparatus as claimed in claim 44 wherein the spiral trough has a width and wherein the width of the spiral trough through the compressing zone is less than the width of the spiral trough through the processing zone.

46. The apparatus as claimed in claim 42 wherein the spiral trough through the processing zone defines a processing zone inlet and a processing zone outlet and wherein the water inlet communicates with the processing zone at a location adjacent to the processing zone outlet.

47. The apparatus as claimed in claim 42 wherein the lifting members have a height and wherein the height of the lifting members through the compressing zone is less than the height of the lifting members through the processing zone.

48. The apparatus as claimed in claim 42 wherein the solid stream outlet is comprised of the drum defining a plurality of perforations in the drum which provide a screen section of the drum, and wherein the perforations are sized so that the solid particles having a size less than or equal to a desired maximum size may exit the drum through the perforations.

49. The apparatus as claimed in claim 48 wherein the solid stream outlet is further comprised of an oversized particle outlet located at the second end of the drum whereby the solid particles having a size greater than the desired maximum size may exit the drum through the oversized particle outlet.

50. The apparatus as claimed in claim 49 wherein the spiral trough extends through the screen section of the drum.

51. The apparatus as claimed in claim 50 wherein the lifting members are not provided in the screen section of the drum.

52. The apparatus as claimed in claim 49 wherein the drum is further comprised of a solid particle mixing section for mixing the solid particles contained within the drum with at least one additive, wherein the solid particle mixing section is located between the compressing zone and the screen section of the drum.

53. The apparatus as claimed in claim 52 wherein the solid particle mixing section is comprised of a sludge inlet zone and a flocculant inlet zone, further comprising a mixing section sludge inlet communicating with the sludge inlet zone and a mixing section flocculant inlet communicating with the flocculant inlet zone.

54. The apparatus as claimed in claim 53 wherein the sludge inlet zone is located between the flocculant inlet zone and the screen section of the drum.

55. The apparatus as claimed in claim 52 wherein the spiral trough extends through the solid particle mixing section.

56. The apparatus as claimed in claim 55 wherein the width of the spiral trough through the solid particle mixing section is greater than the width of the spiral trough through the compressing zone of the drum.

57. An apparatus for processing oil sand to produce a liquid stream comprising water and bitumen and a solid stream comprising solid particles, the apparatus comprising:
(a) a generally cylindrical drum having a first end, a second end and an interior surface, the drum comprising a conditioning zone adjacent to the first end, a compressing zone adjacent to the second end, and a processing zone between the conditioning zone and the compressing zone;
(b) a rotatable spiral trough extending along the interior surface of the drum through the conditioning zone, the processing zone and the compressing zone, for imparting a spiral rolling motion to the oil sand;
(c) a plurality of lifting members oriented generally transversely within and spaced along the spiral trough, for lifting the oil sand as the spiral trough rotates;
(d) an oil sand inlet, wherein the oil sand inlet communicates with the conditioning zone of the drum;
(e) a liquid stream outlet for the drum located at the first end of the drum;
(f) a water inlet, wherein the water inlet communicates with the processing zone of the drum;
(g) a solid stream outlet for the drum located adjacent to the second end of the drum such that the compressing zone is located between the processing zone and the solid stream outlet, wherein the solid stream outlet is comprised of the drum defining a plurality of perforations in the drum which provide a screen section of the drum, and wherein the perforations are sized so that the solid particles having a size less than or equal to a desired maximum size may exit the drum through the perforations; and
(h) a drive mechanism for rotating the spiral trough.

58. The apparatus as claimed in claim 57 wherein the solid stream outlet is further comprised of an oversized particle outlet located at the second end of the drum whereby the solid particles having a size greater than the desired maximum size may exit the drum through the oversized particle outlet.

59. The apparatus as claimed in claim 58 wherein the spiral trough is fixed to the drum so that rotation of the drum rotates the spiral trough and wherein the drive mechanism rotates the drum.

60. The apparatus as claimed in claim 58 wherein the spiral trough extends through the screen section of the drum.

61. The apparatus as claimed in claim 60 wherein the lifting members are not provided in the screen section of the drum.

62. The apparatus as claimed in claim 58 wherein the drum is further comprised of a solid particle mixing section for mixing the solid particles contained within the drum with at least one additive, wherein the solid particle mixing section is located between the compressing zone and the screen section of the drum.

63. The apparatus as claimed in claim 62 wherein the solid particle mixing section is comprised of a sludge inlet zone and a flocculant inlet zone, further comprising a mixing section sludge inlet communicating with the sludge inlet zone and a mixing section flocculant inlet communicating with the flocculant inlet zone.

64. The apparatus as claimed in claim 63 wherein the sludge inlet zone is located between the flocculant inlet zone and the screen section of the drum.

65. The apparatus as claimed in claim 62 wherein the spiral trough extends through the solid particle mixing section.

66. The apparatus as claimed in claim 65 wherein the width of the spiral trough through the solid particle mixing section is greater than the width of the spiral trough through the compressing zone of the drum.

* * * * *